US012561580B2

(12) United States Patent
Vinay et al.

(10) Patent No.: US 12,561,580 B2
(45) Date of Patent: Feb. 24, 2026

(54) GENERATING ENRICHED SCENES USING SCENE GRAPHS

(71) Applicant: Adobe Inc., San Jose, CA (US)

(72) Inventors: Vishwa Vinay, Bangalore (IN);
Tirupati Saketh Chandra,
Visakhapatnam (IN); Rishi Agarwal,
Mumbai (IN); Kuldeep Kulkarni, Ilkal
(IN); Hiransh Gupta, New Delhi (IN);
Aniruddha Mahapatra, Kolkata (IN);
Vaidehi Ramesh Patil, Ratnagiri (IN)

(73) Assignee: Adobe Inc., San Jose, CA (US)

( * ) Notice: Subject to any disclaimer, the term of this
patent is extended or adjusted under 35
U.S.C. 154(b) by 714 days.

(21) Appl. No.: 17/962,962

(22) Filed: Oct. 10, 2022

(65) Prior Publication Data

US 2024/0135197 A1 Apr. 25, 2024

(51) Int. Cl.
*G06N 5/022* (2023.01)

(52) U.S. Cl.
CPC .................................. *G06N 5/022* (2013.01)

(58) Field of Classification Search
CPC ........ G06F 18/24; G06F 40/30; G06F 16/248;
G06F 16/313; G06F 16/367; G06F
18/214; G06F 40/284; G06F 40/35; G06N
3/044; G06N 3/045; G06N 5/022; G06N
20/00; G06N 5/01; G06N 5/02; G06N
5/04; G06V 10/82; G06V 10/426; G05D
1/0088; G05D 1/0212; G05D 1/0246;
G05D 1/0255; G05D 1/0257
See application file for complete search history.

(56) References Cited

U.S. PATENT DOCUMENTS

| | | | | |
|---|---|---|---|---|
| 2014/0168218 | A1* | 6/2014 | Mitrea ............... | H04N 21/8543 |
| | | | | 345/420 |
| 2020/0356829 | A1* | 11/2020 | Costabello .............. | G06F 40/56 |
| 2022/0245109 | A1* | 8/2022 | Hatami-Hanza ......... | G06N 7/01 |

OTHER PUBLICATIONS

Garg, S., et al., "Unconditional Scene Graph Generation", Proceedings of the IEEE/CVF International Conference on Computer Vision (ICCV), 2021, pp. 1-15.

Schuster, S., et al., "Generating Semantically Precise Scene Graphs from Textual Descriptions for Improved Image Retrieval", Proceedings of the 2015 Workshop on Vision and Language (VL'15), 2015, pp. 70-80.

Simonovsky, M., et al., "GraphVAE: Towards Generation of Small Graphs Using Variational Autoencoders", Artificial Neural Networks and Machine Learning, vol. 11139, Feb. 9, 2018, 10 pages.

* cited by examiner

*Primary Examiner* — Shyue Jiunn Hwa
(74) *Attorney, Agent, or Firm* — Nicholson De Vos
Webster & Elliott LLP

(57) ABSTRACT

Embodiments are disclosed for expanding a seed scene using proposals from a generative model of scene graphs. The method may include clustering subgraphs according to respective one or more maximal connected subgraphs of a scene graph. The scene graph includes a plurality of nodes and edges. The method also includes generating a scene sequence for the scene graph based on the clustered subgraphs. A first machine learning model determines a predicted node in response to receiving the scene sequence. A second machine learning model determines a predicted edge in response to receiving the scene sequence and the predicted node. A scene graph is output according to the predicted node and the predicted edge.

20 Claims, 12 Drawing Sheets

200

TRAINING INPUTS 402

TRAINING MODULE
330

ACTUAL OUTPUTS 408

EDGE CLASS MANAGER
414

EDGE PREDICTOR
MODULE 110

PREDICTED OUTPUTS 406

COMPARATOR
410

ERROR SIGNAL 412

500
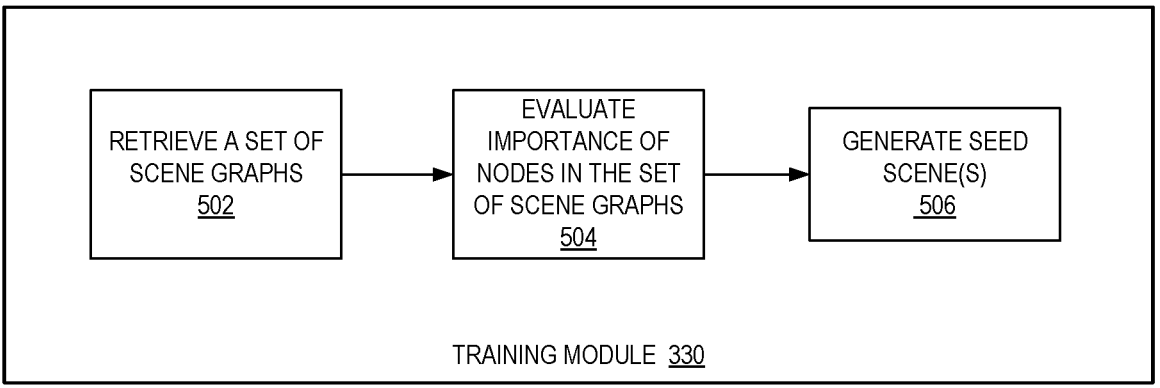
| RETRIEVE A SET OF SCENE GRAPHS 502 | → | EVALUATE IMPORTANCE OF NODES IN THE SET OF SCENE GRAPHS 504 | → | GENERATE SEED SCENE(S) 506 |
TRAINING MODULE 330
*FIG. 5*

600

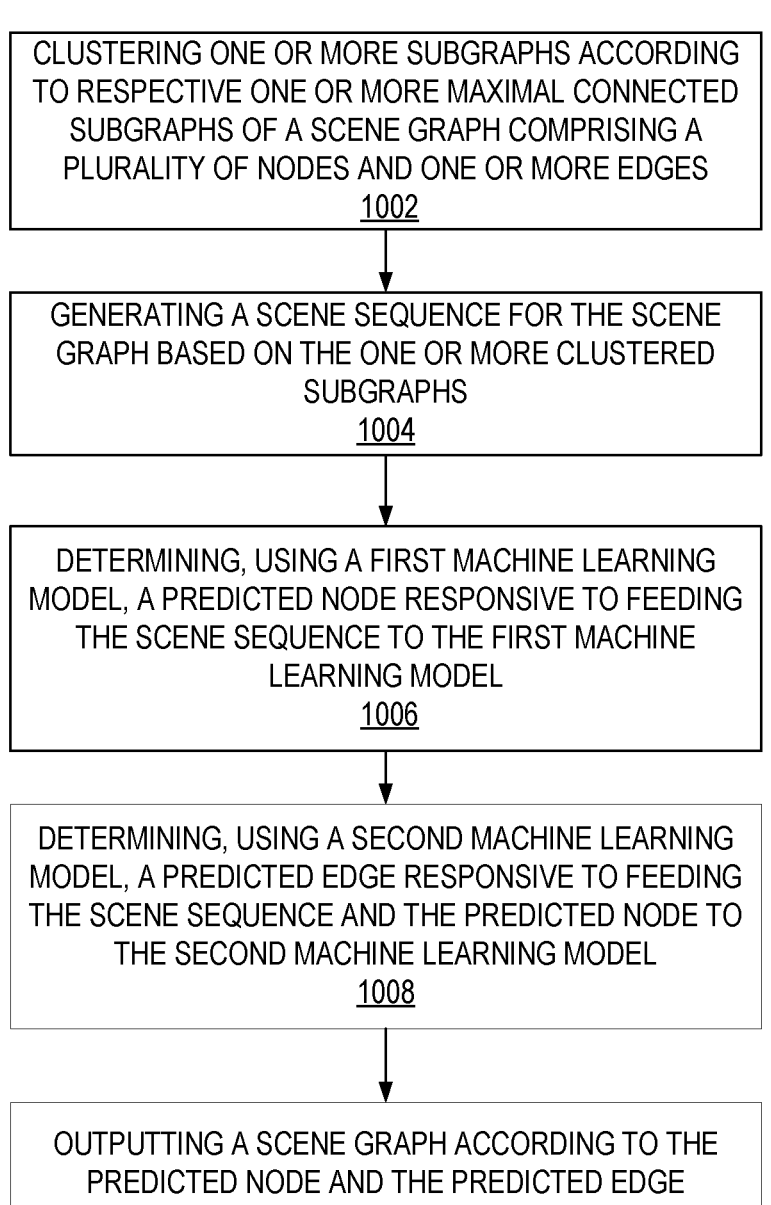

CLUSTERING ONE OR MORE SUBGRAPHS ACCORDING TO RESPECTIVE ONE OR MORE MAXIMAL CONNECTED SUBGRAPHS OF A SCENE GRAPH COMPRISING A PLURALITY OF NODES AND ONE OR MORE EDGES
1002

GENERATING A SCENE SEQUENCE FOR THE SCENE GRAPH BASED ON THE ONE OR MORE CLUSTERED SUBGRAPHS
1004

DETERMINING, USING A FIRST MACHINE LEARNING MODEL, A PREDICTED NODE RESPONSIVE TO FEEDING THE SCENE SEQUENCE TO THE FIRST MACHINE LEARNING MODEL
1006

DETERMINING, USING A SECOND MACHINE LEARNING MODEL, A PREDICTED EDGE RESPONSIVE TO FEEDING THE SCENE SEQUENCE AND THE PREDICTED NODE TO THE SECOND MACHINE LEARNING MODEL
1008

OUTPUTTING A SCENE GRAPH ACCORDING TO THE PREDICTED NODE AND THE PREDICTED EDGE
1010

GENERATING ENRICHED SCENES USING SCENE GRAPHS

BACKGROUND

Artists, photographers, and other creators spend significant time creating a scene. A scene is a set of concepts, or objects and inter-object relationships, captured by a creator in digital media, photographs, and the like. Some digital tools provide "templates" for creators or other various preconfigured objects and relationships arranged in a scene. However, even when using templates, creators must still spend time sifting through various templates before they arrive at the scene they want to capture. Therefore, the bottleneck of any artistic project is the time required to design the scene.

SUMMARY

Introduced here are techniques/technologies to provide recommendations of objects (and their relationships) to a seed set of objects and corresponding relationships. This assists users in constructing scenes by providing recommendations of objects and corresponding relationships in the scene. The recommendations respect object co-occurrence patterns observed during training and are diverse with respect to the existing collection of training data. The recommendations are also diverse with respect to the same seed. The seed set of objects and corresponding relationships (a seed scene, as described herein) is therefore enriched.

Providing coherent (or otherwise logical/relevant) and diverse recommendations to users reduces the consumption of computing resources. For example, if a user is presented with a diverse and coherent set of recommendations, the user is less likely to rerun the recommendation system. In contrast, if a user is presented with irrelevant recommendations that are similar to the seed scene or other generic scenes, the user is likely to rerun the recommendation system. Reducing the number of times that a user runs the recommendation system reduces wasted bandwidth, processing power, and the like.

More specifically, in one or more embodiments, a scene enrichment system is configured to perform scene graph extraction, scene graph expansion, and image generation. Seed scene graphs are expanded into enriched scene graphs using diverse and coherent nodes. Such nodes are logically related nodes that may be expected to occur together. For example, the scene enrichment system does not make recommendations that are irrelevant. The present disclosure describes a scene enrichment system that generates recommendations specific to a specific seed set of objects (e.g., a specific seed graph) rather than generic graphs, resulting in the creation of contextualized enriched scenes.

Diverse and coherent nodes are recommended using machine learning models. The present embodiments modify the loss functions used during training of such machine learning models and describe a scene expansion subsystem that utilizes additional information (e.g., external knowledge, historic relationships, etc.) to recommend nodes and edges of a scene graph.

In particular, the scene enrichment system expands scene graphs as a sequential prediction task including first predicting a new node of the scene graph and subsequently predicting relationships between the new node and the previous nodes in the graph. That is, the scene graph expansion task is transformed to a sequential prediction task.

Additional features and advantages of exemplary embodiments of the present disclosure will be set forth in the description which follows, and in part will be obvious from the description, or may be learned by the practice of such exemplary embodiments.

BRIEF DESCRIPTION OF THE DRAWINGS

The detailed description is described with reference to the accompanying drawings in which:

FIG. 5 illustrates an example of a training module, in accordance with one or more embodiments;

FIG. 10 illustrates a flowchart of a series of acts in a method of enriching a scene in accordance with one or more embodiments;

DETAILED DESCRIPTION

Figure 1:
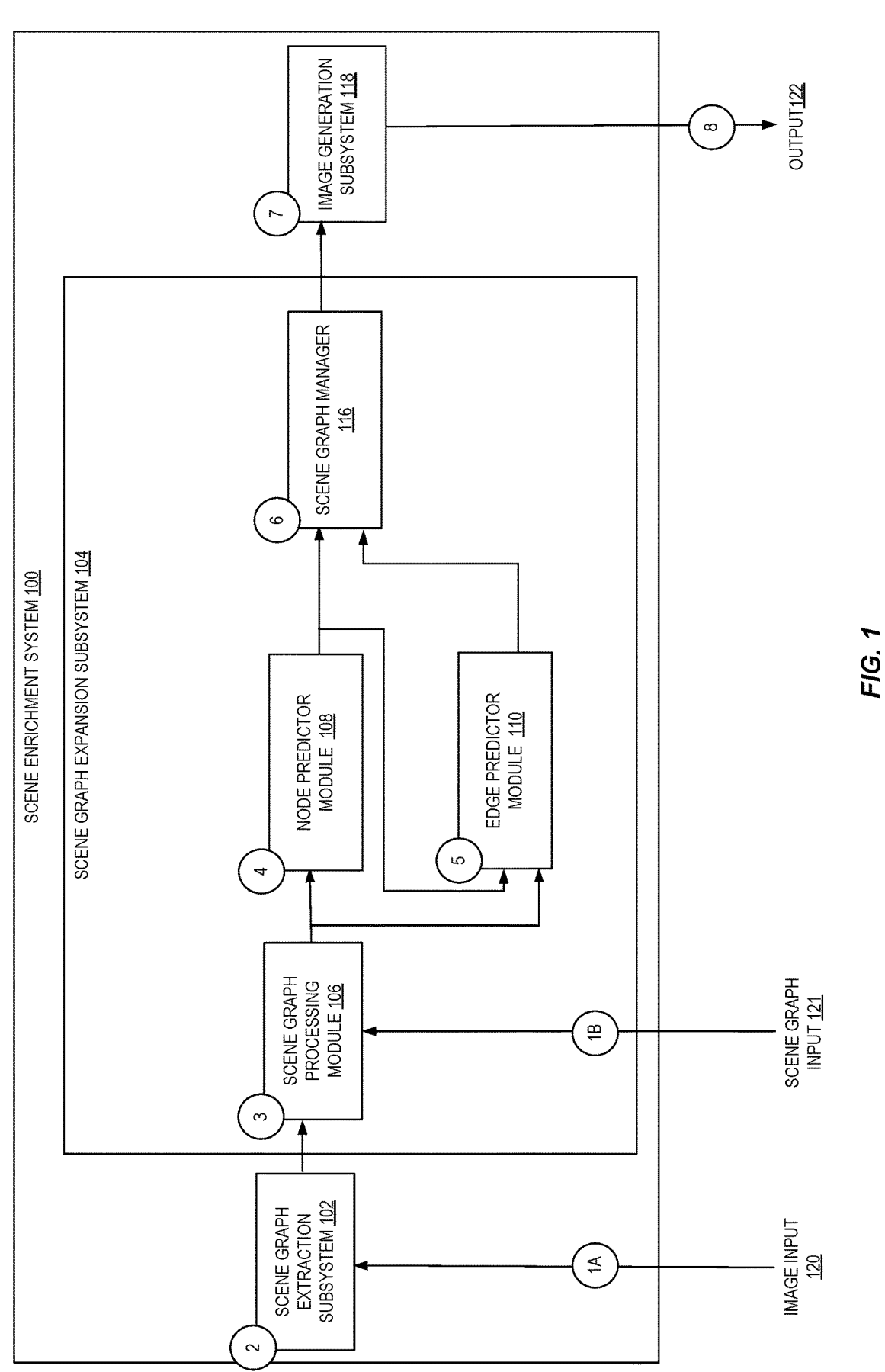
FIG. 1 illustrates a diagram of a process of enriching a seed scene in accordance with one or more embodiments.

One or more embodiments of the present disclosure include a scene enrichment system that recommends enriched scene(s) based on an initial seed scene. One conventional approach uses machine learning models to expand a seed scene. Such prior systems include a first machine leaning module trained to predict nodes, and a second machine learning model trained to predict edges of an expanded scene. However, such techniques tend to simply recommend objects and relationships that were closely tied to the training data used to train the models. This leads to recommendations that are generalized (e.g., not specific with respect to an initial seed scene). Generalized recommendations surface in the form of repeated recommendations of objects in the scene, irrelevant recommendations, and the like. As such, these conventional systems lack the ability to reliably recommend semantically related nodes and underrepresented edges given a unique initial seed scene.

To address these and other deficiencies in conventional systems, the scene enrichment system of the present disclosure learns to recommend coherent objects (e.g., semantically related objects or other logically related objects) by clustering subgraphs of the seed scene graph. The scene enrichment system executes a clustering technique for creating a flattened input sequence from an initial seed scene graph.

Moreover, the scene enrichment system modifies the training of the machine learning models, improving the predictions of such models. For example, the scene enrichment system incorporates an external knowledge term into a loss function during training of a node prediction module, allowing the node prediction module to learn flexibly. Incorporating such external knowledge term improves the scene enrichment system's ability to learn/predict similar objects, resulting in diverse node predictions.

The scene enrichment system also incorporates class balanced loss into a loss function during training of an edge prediction module. Balancing the classes of edges allows the edge prediction module to make relevant edge predictions. Without incorporating class balancing, the edge prediction module would predict edges based on the statistical abundance of edges in the training dataset. As such, the edge predictions would not be relevant because such predictions would be biased by the classes in the training dataset.

Lastly, the scene enrichment system incorporates historic node-edge relationships (e.g., an adjacency matrix) in the edge prediction module. Incorporating such historic node-edge relationships improves the reliability of coherent edge predictions by characterizing the predicted edge with respect to all of the previous nodes/edges.

Embodiments of the present disclosure provide diverse and coherent scene graph recommendations by modifying the loss functions used during training, and providing the machine learning models of the scene enrichment system additional information (e.g., external knowledge, historic relationships, etc.). The resulting machine learning models of the scene enrichment system generate more varied content recommendations that do not just closely resemble the dominant features of the training data. Because of the diversity and semantic relatedness of the recommendations, users spend less time (and therefore fewer computing resources such as power, memory, bandwidth, etc.) creating a digital artistic project. For example, a user that is presented with an enriched scene that is coherently related to the original seed scene may stop further processes (e.g., save the scene, print the scene, etc.). As such, the expenditure of wasteful resources is reduced as the user spends less time (and therefore fewer computing resources) modifying a seed scene.

FIG. 1 illustrates a diagram of a process of enriching a seed scene in accordance with one or more embodiments. As shown in FIG. 1, embodiments include a scene enrichment system 100. The scene enrichment system 100 includes a scene graph extraction subsystem 102, a scene graph expansion subsystem 104, and/or an image generation subsystem 118. The scene enrichment system 100 is responsible for generating coherent and diverse enriched seed scenes.

In some embodiments, initially the scene enrichment system 100 receives an input, such as image input 120 or scene graph input 121. In some embodiments, the image input 120 may be a computer generated image, a frame of a video, a picture captured by a camera (or other sensor), and the like. In other embodiments, the input 121 is a scene graph. For example, a user creates a digital scene graph in a digital canvas or other medium. A scene graph is human consumable construct that is a collection of {subject, relationship, object} tuples. The collection of tuples captures the content of the scene. The scene graph is a collection of nodes (e.g., objects) and edges that characterize the relationship of each of the nodes of the graph. The edges in the scene graph are directed, indicating orientations of objects in their relationship to one another.

The scene enrichment system 100 processes the input differently depending on the type of input received. For example, at numeral 1A, the scene graph extraction subsystem 102 receives an image input 120. The image input 120 is received by the scene graph extraction subsystem 102 which extracts a scene graph from the image. In other embodiments, a scene graph can be received directly (e.g., scene graph input 121). For example, at numeral 1B, the scene graph input 121 is received by the scene graph expansion subsystem 104, and particularly the scene graph processing module 106. Although either an image or a scene graph may be received as the initial input, for ease of description it is assumed that the received input is image input 120.

At numeral 2, the scene graph extraction subsystem 102 extracts a scene graph from the input image. The scene graph extraction subsystem 102 employs any suitable algorithm to perform scene graph extraction. For example, one or more object recognition algorithms may draw boundary boxes around objects in an image and classify each of the objects identified in the boundary boxes in the image. The classified objects correspond to nodes of the scene graph. The edges of the scene graph may be determined using a relationship-identification model that labels connections between the objects. Additionally or alternatively, the scene graph extraction subsystem 102 may convert each pixel in the image to a node of a scene graph and create edges of the scene graph corresponding to the relationships of the pixels in the image.

Generally, images such as input 120 include several disconnected objects (e.g., a boy and a girl). Disconnected objects in the image naturally correspond to disconnected subgraphs of the scene graph. The relationships between the objects in the image correspond to bi-directional edges in the scene graph. Accordingly, the scenes extracted by the scene graph extraction subsystem 102 are sparse as most object-object pairs do not have a relationship between them. As described herein, directed edges indicate orientations of objects of an image and in the relationship of such objects to one another.

At numeral 3, the scene graph processing module 106 of the scene graph expansion subsystem 104 receives the scene graph extracted via the scene graph extraction subsystem 102. In some embodiments, the scene graph processing module 106 receives a scene graph (e.g., as scene graph input 121). Operations of the scene graph processing module 106 are further described with reference to FIG. 2. In general, the scene graph processing module 106 identifies and clusters disconnected subgraphs. A subgraph is a subset of connected nodes and edges of the scene graph. For example, in some implementations, the scene graph processing module 106 identifies each of the maximally connected subgraphs of the scene graph. Maximally connected subgraphs are a particular class of subgraphs where each node in the subgraph is connected in the scene graph.

As described herein, clustering subgraphs allows the scene graph expansion subsystem 104 to ensure that groups of objects connected in the scene graph occur close in the together in the scene graph. Clustering subgraphs allows the scene graph expansion subsystem 104 to learn clusters of objects that co-occur across one or more datasets. Sequencing clustered subgraphs together retains the clustering patterns amongst the nodes in the scene graph. As a result of sequencing the clustered subgraphs, the scene graph expansion subsystem 104 expands the scene by providing more relevant nodes and edges (e.g., via node predictor module 108 and/or edge predictor module 110) using the clustered subgraphs identified by the scene graph processing module 106.

In some embodiments, the scene graph processing module 106 flattens each of the subgraph clusters by executing a graph searching algorithm (e.g., a graph traversal algorithm). For example, the scene graph processing module 106 may execute a breadth-first search algorithm, a depth-first search algorithm, and the like. The scene graph processing module 106 executes the graph searching algorithm by randomly choosing a node ordering of the clustered subgraph. The flattened clustered subgraphs are considered clustered subgraph sequences.

In some embodiments, the scene graph processing module 106 concatenates each of the clustered subgraph sequences to generate a single scene sequence. Concatenating the clustered subgraph sequences in a random order introduces robustness with respect to the input 120. Moreover, randomly concatenating the clustered subgraph sequences increases the data available for a training dataset by introducing randomness. At the end of the scene sequence, the scene graph processing module 106 appends an end-of-sequence token (e.g., raises a flag, sets a bit, inserts a predefined node, etc.).

The scene graph processing module 106 exports the scene sequence to the node predictor module 108 and the edge predictor module 110. The node predictor module 108 and the edge predictor module 110 are each neural networks. A neural network includes a machine-learning model that can be tuned (e.g., trained) based on training input to approximate unknown functions. In particular, a neural network includes a model of interconnected digital neurons that communicate and learn to approximate complex functions and generate outputs based on a plurality of inputs provided to the model. For instance, the neural network includes one or more machine learning algorithms. In other words, a neural network is an algorithm that implements deep learning techniques, i.e., machine learning that utilizes a set of algorithms to attempt to model high-level abstractions in data. Additional details with respect to the use of neural networks as node predictor module 108 and edge predictor module 110 are discussed below with respect to FIGS. 3 and 4.

Described using mathematics, the scene sequence can be described as a matrix according to Equation (1) below.

$$P(S(G)) = \Pi_{i=1}{}^n P(v_i | S_{<i}) x P(\varepsilon_i | S_{<i}, v_i) \tag{1}$$

The sequence $S(G)$ of graph $G$ is a collection of nodes and edges such that $S(G) = \{(v_i, \varepsilon_i)\}_{i=1}{}^n$ where $v_i$ indicates the $i^{th}$ node in the sequence and $\varepsilon_i$ indicates a relationship between the nodes in the sequence such that $\varepsilon_i = \{\varepsilon_{i,j}\}_{j<i} = (e_{i,j}, e_{j,i})$. In other words, $\varepsilon_i$ includes a list of edge information for every node i with every node j before it in the sequence. In particular, $\varepsilon_i$ indicates a pair of edge relationships $(e_{i,j}, e_{j,i})$ between nodes such that, for example, $e_{i,j}$ represents the relationship from $v_i$ to $v_j$. Equation (1) illustrates how scene graph $S(G)$ is a matrix (e.g., an adjacency matrix) where a cell i–j in the matrix carries information about the relationship between node $v_i$ and node $v_j$. The characterization of the scene sequence $S(G)$ as an adjacency matrix of clustered scene graphs provides the totality of historic node-edge relationships to the node predictor module 108 and/or the edge predictor module 110.

In Equation (1) above, $P(v_i | S_{<i})$ indicates a likelihood of an $i^{th}$ node of a sequence $v_i$ given information about all nodes and edges occurring before the $i^{th}$ node in the sequence (e.g., $S_{<i}$). The likelihood of the node of a sequence can be modeled using a first machine learning model, (e.g., node predictor module 108) and is denoted as $f_{node}$.

At numeral 4, the node predictor module 108 (e.g., $f_{node}$) predicts a distribution of the $i^{th}$ node $\hat{v}_i$. The node predictor module 108 may be any auto-regressive model trained to predict a distribution of the most likely nodes of the sequence (e.g., node $\hat{v}_i$) using state information. For example, the node predictor module 108 may be configured as a recurrent neural network, gated recurrent unit (GRUs), long short term memory unit, etc.

A state is a characterization of the patterns of a sequence. Ideally (in the absence of external factors), applying a state to a value of a sequence would result in a perfect prediction of the next (future) value of the sequence. The state captures the dependence of the sequence by characterizing the previous (historic) values of the sequence.

The node predictor module 108 predicts $\hat{v}_i$ as shown in Equation (2)

$$\hat{v}_i \sim f_{node}(S_{i-1}, h_{node}(S_{<i})) \tag{2}$$

The prediction of the $i^{th}$ node depends on the previous node of the sequence $S_{i-1}$ and the state characterization of the previous nodes of the sequence (e.g., $h_{node}(S_{<i})$).

In Equation (1) above, $P(\varepsilon_i | S_{<i}, v_i)$ indicates a likelihood of an edge of a sequence given information about all nodes and edges occurring before the the $i^{th}$ node in the sequence (e.g., $S_{<i}$) with respect to the $i^{th}$ node. $P(\varepsilon_i | S_{<i}, v_i)$ is described mathematically in Equation (3):

$$P(\varepsilon_i | S_{<i}, v_i) = \prod_{j<i} P(\varepsilon_{i,j} | S_{<i}, \varepsilon_{i,<j}, v_i, v_j) \tag{3}$$

As described, the likelihood of the $i^{th}$ pair of edges (e.g. $e_{i,j}, e_{j,i}$) is conditional on the $i^{th}$ node and considers information about all prior nodes and edges. The likelihood of the edge of the sequence can be modeled according to a second machine learning model (e.g., edge predictor module 110) and is denoted as $f_{edge}$. As described herein, the incorporation of information about all prior nodes and edges (e.g., adjacency matrix, or historic node-edge relationships) improves edge predictions by characterizing the predicted edge with respect to all of the previous nodes/edges. That is, the edge predictor module 110 considers the interplay of all of the previous nodes/edges (e.g., historic node-edge relationships) when predicting edges.

At numeral 5, the edge predictor module 110 (e.g., $f_{edge}$) receives the output of the node predictor module 108 and the scene graph processing module 106. Using a predicted node (e.g., the output of the node predictor module 108) and the scene sequence (e.g., the output of the scene graph processing module 106), the edge predictor module 110 predicts edge relationships between predicted node $v_i$ and one or more previous predicted nodes/present nodes of the sequence. That is, for each new predicted node, the edge module 110 predicts edges with k previous nodes. The number of predicted nodes (k) indicates a number of previous nodes to take into account for the prediction of the edges. Predicting a larger number of nodes (e.g., a large k) results in the edge predictor module 110 prediction of edges much larger in number than is expected in the training data. The predicted edges using a large k are degenerate (e.g., the dominant edges in the training data based on the statistical frequency of the edge in the training data) and/or describe an irrelevant relationship between the nodes. Predicting a smaller number of nodes (e.g., a lower k) results in the edge predictor module 110 prediction of edges based on context, rather than dominant edges in the training data.

In some implementations, the value of k is determined as the maximum degree (out-degree+in-degree) of a node in a graph such that a portion of nodes in the graphs of the training set have a degree less than or equal to k. For instance, 99% of the nodes in the graphs of the training set may have a degree less than or equal to k.

The edge predictor module 110 may be any auto-regressive model configured to predict edge relationships between nodes of the sequence (e.g., $\widehat{e_{i,j}}$, $\widehat{e_{j,i}}$) using state information. For example, the edge predictor module 110 may be configured as a recurrent neural network, GRU, long short term memory unit, etc. The edge predictor module 110 predicts ($\widehat{e_{i,j}}$, $\widehat{e_{j,i}}$) as shown in Equations (4)-(5):

$$\widehat{e_{i,j}} \sim f_{edge}(v_i,v_j,h_{edge}(S_{<i},\varepsilon_{i,<j})) \tag{4}$$

$$\widehat{e_{j,i}} \sim f_{edge}(v_j,v_i,h_{edge}(S_{<i},\varepsilon_{i,<j},\widehat{e_{i,j}})) \tag{5}$$

As shown, and described herein, the prediction of edge relationships ($\widehat{e_{i,j}}$, $\widehat{e_{j,i}}$) is sequential. That is, the prediction of the edge occurs responsive to receiving a prediction of a node. Accordingly, the prediction of edges incorporate historic node-edge relationships (e.g., the adjacency matrix $S_{<i}$, $\varepsilon_{i,<j}$) and local nodes $v_i$ and $v_j$ (e.g., a local context). Conditionally predicting edges produces more realistic and coherent/relevant enriched scene graphs. Accordingly, the scene graph expansion subsystem 104 is able to more effectively predict a large number of relationships in a typical scene dataset.

As shown, the scene expansion subsystem 104 employs two auto-regressive models (e.g., node predictor module 108 and edge predictor module 110) such that each auto-regressive module learns to characterize a different portion of a scene sequence. The node predictor module 108 learns how to predict a future node given a sequence of nodes and edges, and the edge predictor module 110 learns how to predict a future edge given the sequence of nodes and edges.

At numeral 6, the scene graph manager 116 extends the scene sequence (or scene graph) by iteratively adding nodes and edges. The node predictor module 108 feeds the scene graph manager 116 a node distribution over various classes of nodes. Such distribution is a multinomial distribution. In some embodiments, the scene graph manager 116 determines a predicted node by sampling the distribution of predicted nodes. In other embodiments, the node predictor module 108 determines the predicted node by sampling the distribution of predicted nodes. As described herein, the edge predictor module 110 receives the distribution of predicted nodes (or the sampled predicted node). The edge predictor module 110 predicts an edge by predicting a relationship between the predicted node and other nodes of the sequence. The scene graph manager 116 appends the predicted nodes and predicted edges to the scene sequence (or scene graph), enriching the scene sequence.

Figure 6:
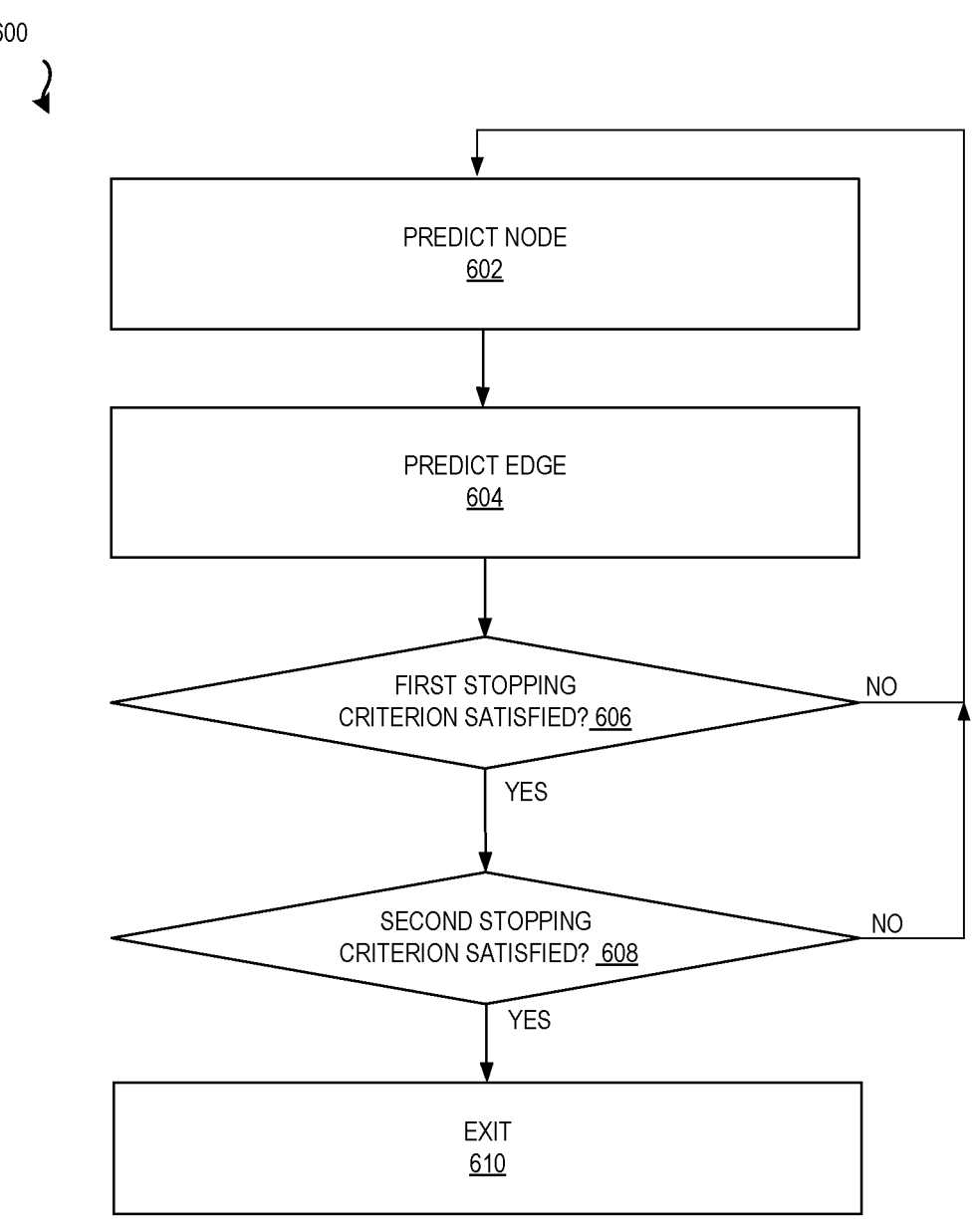
FIG. 6 illustrates a flowchart of a series of acts in a method of generating multiple enriched scenes using a single seed scene, in accordance with one or more embodiments.

The scene graph manager 116 continues appending nodes and edges until a stopping criterion (e.g., an end of sequence token, a user preference, etc.). Because the scene graph manager 116 determines the predicted node by sampling a distribution of various classes of nodes determined by the node predictor module 108, the process is repeated M times to generate M alternate scenes using the same seed scene. FIG. 6 described herein illustrates an example process of generating M scenes using one seed scene.

In some embodiments, the scene graph manager 116 outputs the modified scene sequence as output 122. In some embodiments, the scene graph manager 116 converts the modified scene sequence into a scene graph and outputs the graph as output 122. The scene graph manager 116 converts the scene sequence into the scene graph using any conventional method. For example, the scene graph manager 116 may build the scene graph using the adjacency matrix, connecting nodes to one another using edge information contained in the adjacency matrix.

At numeral 7, the scene graph manager 116 feeds the scene sequence (or the scene graph) to the image generation subsystem 118. The image generation subsystem 118 is configured to generate an image from the scene sequence/scene graph using any conventional method. For example, the image generation subsystem 118 may predict bounding boxes for the nodes of the scene graph and lay out the bounding boxes in a scene layout.

At numeral 8, the scene enrichment system 100 outputs output 122. Output 122 is the scene sequence (determined by the scene graph manager 116), the scene graph (determined by the scene graph manager 116), and/or the image (determined by the image generation subsystem 118). The output 122 serves as a template for one or more users, providing plausible recommendations of objects/relationships expected to be in the input scene 120. The output 122 is displayed on one or more user devices and/or communicated to one or more downstream devices (e.g., servers, applications, systems, processors, or some combination). The downstream devices may perform subsequent processing on output 122.

As illustrated, the scene enrichment system 100 includes various subsystems such as the scene graph extraction subsystem 102, the scene graph expansion subsystem 104, and the image generation subsystem 118. It should be appreciated that the scene enrichment system 100 may also be considered a single system. For example, the scene enrichment system 100 may be an end-to-end system. The end-to-end system is trained as a whole entity. For instance, as opposed to training the scene graph expansion subsystem 104 (e.g., the node predictor module 108 and the edge predictor module 110) as described herein, the scene graph extraction subsystem 102, the scene graph expansion subsystem 104, and the image generation subsystem 118 are trained together. For example, training inputs are input 120 (e.g., images) fed to the scene graph extraction subsystem, and the corresponding outputs are enriched scene graphs (or enriched images). These input-output pairs may be manually labeled (e.g., by a user).

Figure 2:
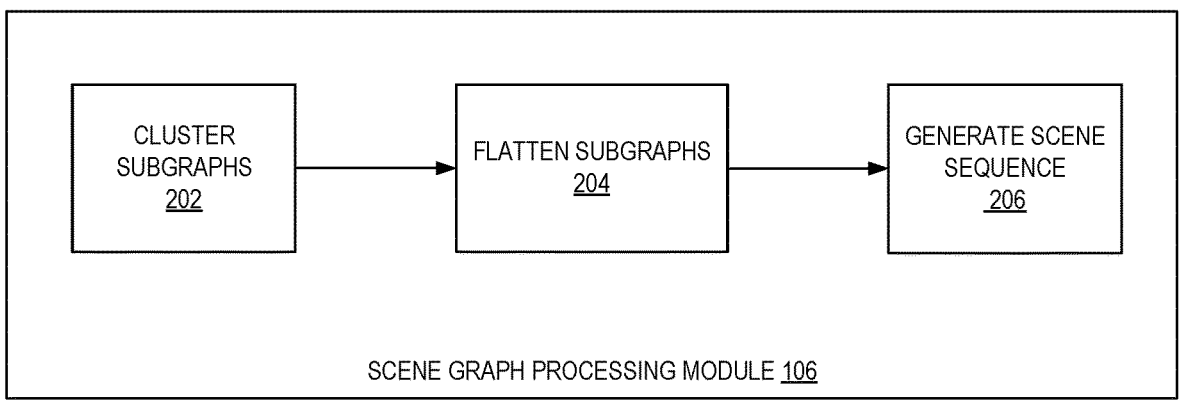
FIG. 2 illustrates an example of a scene graph processing module, in accordance with one or more embodiments.

FIG. 2 illustrates an example 200 of a scene graph processing module, in accordance with one or more embodiments. The example 200 is intended to illustrate some of the operations of the scene graph processing module 106 involved in generating a scene sequence. Alternative embodiments can include additional, fewer, or different operations than those articulated in FIG. 2.

The scene graph processing module 106 clusters disconnected subgraphs at 202. For example, the scene graph processing module 106 identifies each of the maximally connected subgraphs of the scene graph. Each maximally connected subgraph is a clustered subgraph.

In response to determining one or more clusters of subgraphs, the scene graph processing module 106 flattens each of the subgraph clusters at 204. The scene graph processing module 106 flattens each of the subgraph clusters by randomly choosing a node ordering and applying any suitable graph searching algorithm (such as breadth-first searching algorithms, depth-first searching algorithms, and the like) to the subgraph clusters. Flattening the subgraph converts the subgraph into a sequence.

Subsequently, the scene graph processing module 106 generates a scene sequence using the flattened clustered sequences at 206. The scene graph processing module 106 concatenates each of the clustered sequences to generate a scene sequence. The randomly concatenated clustered sequences introduce robustness to the scene graph expansion subsystem 104 (e.g., increasing the ability of the node predictor module 108 and/or the edge predictor module 110 in learning to predict coherent and diverse nodes and edges respectively).

Figure 3:
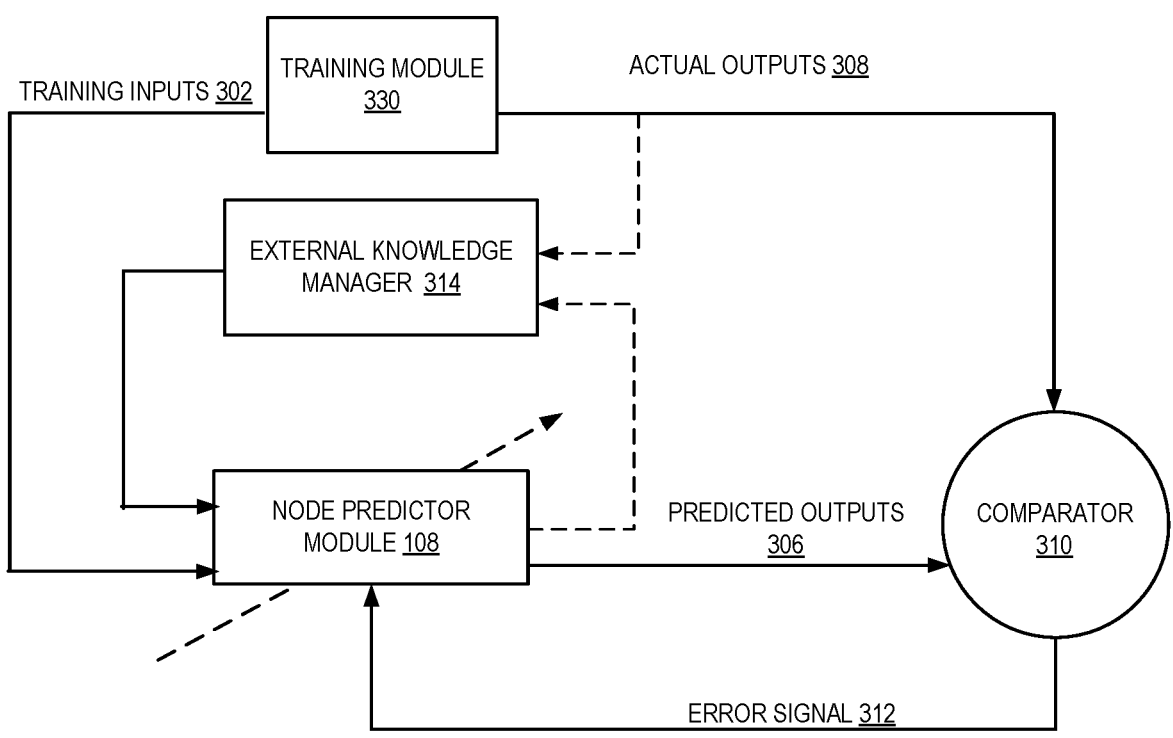
FIG. 3 depicts a block diagram of the node predictor module trained using supervised learning, in accordance with one or more embodiments.

FIG. 3 depicts a block diagram of the node predictor module trained using supervised learning, in accordance with one or more embodiments. The node predictor module 108 uses supervised learning to predict nodes that are expected (or otherwise relevant) to the scene graph. Supervised learning is a method of training a machine learning model given input-output pairs. An input-output pair is an input with an associated known output (also referred to herein as an expected output or a labeled output). The node predictor module 108 is trained on known input-output pairs (e.g., seed scenes and scene graphs). As described with reference to FIG. 5, training module 330 is configured to provide the input-output pairs used during training. Once the node predictor module 108 has learned how to predict known input-output pairs, the node predictor module 108 can operate on unknown inputs to predict an output.

As described herein, training inputs include seed scene graphs extracted from scene graphs. For example, training input 302 may be a scene graph describing one or two objects. Actual outputs 308 may include an expanded scene graph containing at least the one or two objects of the seed scene graph.

Generally, the node predictor module 108 uses the training inputs 302 (e.g., an $i^{th}$ node of the seed scene graph) to predict outputs 306 (e.g., the $i^{th}$ node of a predicted expansion of the seed scene graph, $\hat{v}_i$), by applying the current state of the node predictor module 108 to the training inputs 302. In operation, the node predictor module 108 predicts a distribution of nodes that represent the predicted expansion of the seed scene graph. The comparator 310 compares the predicted outputs 306 to the actual outputs 308 (e.g., the $i^{th}$ node of the true scene graph, $v_i$) to determine an amount of error or difference.

The error (represented by error signal 312) determined by comparator 310 is used to adjust the weights of the node predictor module 108 such that the node predictor module 108 learns (or changes) over time to generate a relatively accurate prediction of one or more nodes of the true scene graph (or a semantically related scene graph). The error may be calculated each iteration (e.g., each pair of training inputs 302 and associated actual outputs 308), batch, and/or epoch, and propagated through all of the algorithmic weights in the node predictor module 108 such that the algorithmic weights adapt based on the amount of error.

The error is minimized using a loss function. An example loss function utilized during training of the node predictor module 108 may be the cross-entropy function. Minimizing the cross-entropy error function represents minimizing the differences between the probability distribution of the predicted outputs 306 and the probability distribution of the actual outputs 308.

The node prediction loss is mathematically described in Equation (6):

$$l_{node}(p_{v_i}, \widehat{p_{v_i}}) = H(p_{v_i}, \widehat{p_{v_i}}) \tag{6}$$

In Equation (6) above, H is the cross entropy loss between a 1-hot encoding of the $i^{th}$ node of the true scene graph $p_{v_i}$, and the $i^{th}$ node of a predicted expansion of the seed scene graph, $\widehat{p_{v_i}}$. By comparing the error of the predicted output 306 to the actual output 308, the node predictor module 108 does not consider "near misses" (e.g., predicted outputs 306 that are semantically related and/or otherwise similar to the actual output 308).

To encourage flexibility during training (e.g., diverse and coherent predicted outputs 306 that are similar to the ground truth outputs 308 (e.g., a generality of node types)), the node predictor module 108 considers external knowledge from the external knowledge manager 314. Incorporating the external knowledge loss term into node prediction training results in predicting nodes that are similar to the expected nodes. That is, training the node predictor module 108 using external knowledge results in generalization of node predictions, encouraging diverse node predictions instead of multiple similar node predictions.

The node prediction loss is therefore modified, as described in Equation (7) below:

$$l_{node}(p_{v_i}, \widehat{p_{v_i}}) = (1-\alpha)H(p_{v_i}, \widehat{p_{v_i}}) + \alpha H(p_{v_i}, q_i) \tag{7}$$

In Equation (7) above, $\alpha$ is a hyperparameter and the term $q_i$ is a parameter considering external knowledge (also referred to as the external knowledge term). Incorporating the external knowledge term $q_i$ into node prediction training enables the node predictor module 108 to predict nodes that are similar to expected nodes. The $q_i$ parameter is a label based on the similarity between the predicted node $\hat{v}_i$ and the expected node $v_i$.

In an example implementation, the external knowledge manager 314 receives predicted output 306 (and/or expected output 308) and queries one or more external knowledge databases for external knowledge. External knowledge is a vector representation of words referred to as word embeddings. Accordingly, using the predicted output 306 (and/or the expected output 308), the external knowledge manager 314 retrieves (e.g., queries) one or more word embeddings from the one or more external knowledge databases. The external knowledge databases may be remote and/or local. Equation (8) below describes a mathematical representation of the external knowledge term.

$$q_i = \min_q KL(q, \widehat{p_{v_i}}) - E_{v \sim q}[f(v, v_i)] \tag{8}$$

In Equation (8) above, the external knowledge term $q_i$ is the difference between the Kullback-Leibler Divergence with respect to the external knowledge term and the predicted node, and the similarity between the predicted node $\hat{v}_i$, or 306, and the expected node $v_i$, or 308 (e.g., the expectation $E_{v \sim q}$). Utilizing the external knowledge term $q_i$ allows the node predictor module 108 to evaluate a predicted node that may be different from the ground truth node, but similar to the external knowledge term. As such, the node predictor module 108 is able to learn/predict similar nodes, as opposed to exact nodes (e.g., ground truth nodes).

The node predictor module 108 is trained until the error determined by the comparator 310 is within a certain threshold (or a threshold number of batches, epochs, or iterations have been reached). The trained predictor module 108 and the associated weighting coefficients are subsequently stored in memory or other repository such that the predictor module 108 may be employed on unknown data (e.g., not training inputs 302).

Figure 4:
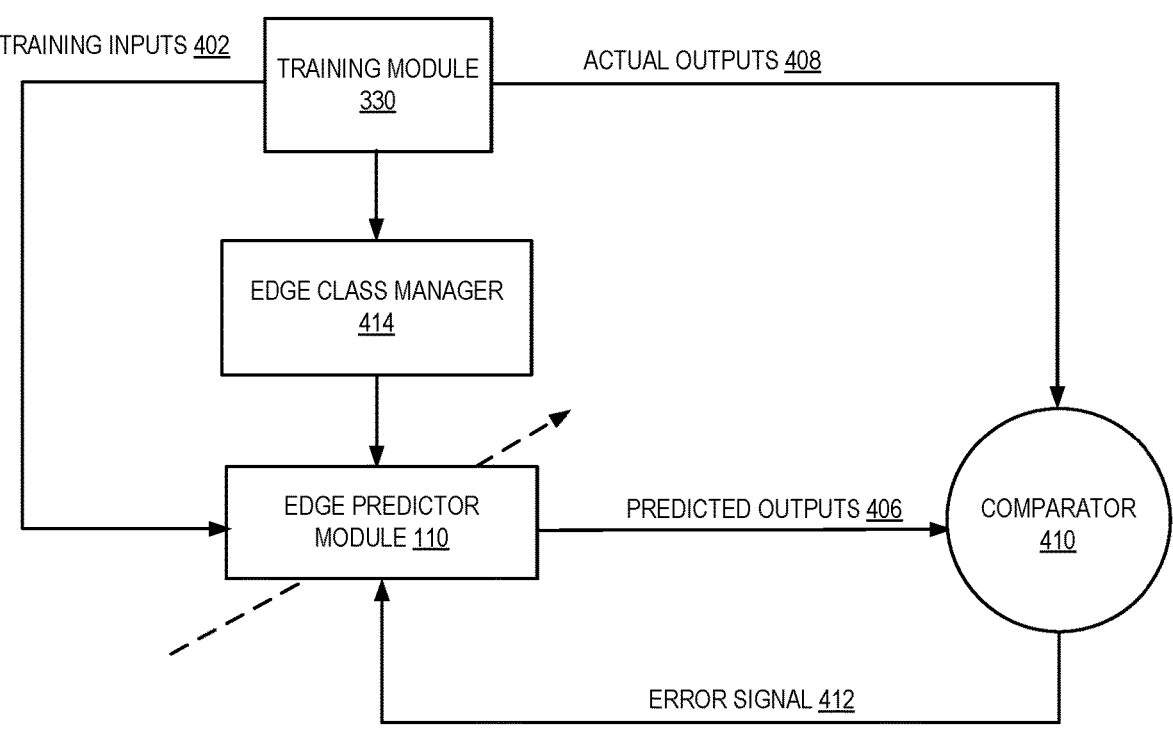
FIG. 4 depicts a block diagram of the edge predictor module trained using supervised learning, in accordance with one or more embodiments.

FIG. 4 depicts a block diagram of the edge predictor module trained using supervised learning, in accordance with one or more embodiments. The edge predictor module 110 uses supervised learning to learn to predict edges connecting nodes in the scene graph. As described herein, supervised learning is a method of training a machine learning model given input-output pairs. As described with reference to FIG. 5, training module 330 is configured to provide input-output pairs used during training. Once the edge predictor module 110 has learned how to predict known input-output pairs, the edge predictor module 110 can operate on unknown inputs to predict an output.

As described herein, training inputs include seed scene graphs extracted from scene graphs. For example, training input 402 may be a scene graph describing one or two objects. Actual outputs 408 may include an expanded scene graph containing at least the one or two objects of the seed scene graph.

Generally, the edge predictor module 110 uses training inputs 402 (e.g., an edge in a first direction between two nodes i and j of the seed scene graph) to predict outputs 406 (e.g., a predicted edge relating a predicted node to one or more nodes of the seed scene graph) by applying the current state of the edge predictor module 110 to the training inputs 402. The comparator 410 compares the predicted outputs 406 to the actual outputs 408 (e.g., an actual edge of the scene graph) to determine an amount or error or difference.

The error (represented by error signal 412), determined by comparator 410, is used to adjust the weights of the edge predictor module 110 such that the edge predictor module 110 learns (or changes) over time to generate a relatively accurate prediction of one or more edges of the true scene graph (or a semantically related scene graph). The error may be calculated each iteration (e.g., each pair of training inputs 402 and associated actual outputs 408), batch, and/or epoch, and propagated through all of the algorithmic weights in the edge predictor module 110 such that the algorithmic weights adapt based on the amount of error.

The error is minimized using a loss function. An example loss function utilized during training of the edge predictor module 110 is the cross-entropy function. As described herein, minimizing the cross-entropy error function represents minimizing the differences between the probability distribution of the predicted outputs 406 and the probability distribution of the actual outputs 408.

The edge prediction loss is mathematically described in Equations (9)-(10)

$$l_{edge}(p_{e_{i,j}}, p_{\widehat{e_{i,j}}}) = H(p_{e_{i,j}}, p_{\widehat{e_{i,j}}}) \tag{9}$$

$$l_{edge}(p_{e_{j,i}}, p_{\widehat{e_{j,i}}}) = H(p_{e_{j,i}}, p_{\widehat{e_{j,i}}}) \tag{10}$$

In Equation (9), H is the cross-entropy loss between a 1-hot encoding of the connection between nodes i and j of the true scene graph ($p_{e_{i,j}}$), and a probability distribution of a predicted edge between nodes i and j ($p_{\widehat{e_{i,j}}}$). Similarly, in Equation (10), H is the cross-entropy loss between a 1-hot encoding of the connection between nodes j and i of the true scene graph ($p_{e_{j,i}}$) and a probability distribution of a predicted edge between nodes j and i ($p_{\widehat{e_{j,i}}}$).

It should be appreciated that the edge dataset is an imbalanced dataset. For example, some edge connections between nodes may be more common than other edge connections between nodes. In a particular example, edge connections can include the relationship "has" and "wearing." For instance, two nodes and an edge may be represented as "boy has hat." Alternatively, two nodes and an edge may be represented as "boy wearing hat." In general, the edge connection "has" may appear much more frequently in a dataset than the edge connections "wearing." Because of the imbalanced frequency of the edge connection "has," the edge dataset is considered a skewed dataset with skewed edge connection classes.

To reduce the effect of a skewed distribution across edge connection classes, the edge predictor module 110 considers class balance loss. Balancing the classes of edges allows the edge prediction module 110 to make relevant edge predictions. Without incorporating class balancing, the edge prediction module 110 would predict edges based on the statistical abundance of edges in the training dataset. The edge predictor module 110 uses class balancing during training to learn to predict fewer dominate edges (e.g., edges that are more frequent in the dataset).

Incorporating class balance loss into the edge loss function during training discourages the edge predictor module 110 from predicting edges based on the statistics of the predicted edge in the dataset. That is, the edge prediction module 110 is discouraged from predicting dominant edges merely because of the presence of dominant edges in the dataset. The edge prediction loss is therefore modified, as described in Equations (11)-(12) below.

$$l_{edge}(p_{e_{i,j}}, p_{\widehat{e_{i,r}}}) = \frac{1 - \beta}{1 - \beta^{N_e}} H(p_{e_{i,j}}, p_{\widehat{e_{i,r}}}) \tag{11}$$

$$l_{edge}(p_{e_{j,i}}, p_{\widehat{e_{j,i}}}) = \frac{1 - \beta}{1 - \beta^{N_e}} H(p_{e_{j,i}}, p_{\widehat{e_{j,i}}}) \tag{12}$$

In Equations (11)-(12) above, $\beta$ is a hyperparameter and $N_e$ is the number of instances of the edge across the dataset. As shown, in Equations (11)-(12), the edge loss is divided by the number of occurrences of the edge type. In effect, the loss associated with a frequent edge (e.g., a smaller denominator) is less than a loss associated with a rare edge (e.g., a larger denominator). As such, the weights in the edge predictor module 110 are more affected by losses associated with incorrectly predicted rare edges. In other words, less importance is given to commonly predicted edges, and more importance is given to rare predicted edges.

The edge class manager 414 determines the frequency of the edge in the dataset. For instance, the edge class manager 414 receives a set of training scene graphs from the training module 330. The edge class manager 414 scans through data of the scene graph and calculate the frequency of each edge (e.g., how many times the edge occurs in the dataset). The edge class manager 414 feeds the class balance information (e.g., the number of instances of each edge across the dataset (e.g., $N_e$)) to the edge predictor module 110.

FIG. 5 illustrates an example 500 of a training module 330, in accordance with one or more embodiments. The example 500 is intended to illustrate some of the operations of the training module 330 involved in generating training data. Alternative embodiments can include additional, fewer, or different operations than those articulated in FIG. 5.

The training module 330 retrieves a set of scene graphs from one or more servers, databases, and the like at 502. Such scene graphs may be located remotely (e.g., an external server, on a cloud environment, etc.) and/or locally (e.g., within the same network as training module 330).

In response to retrieving the set of scene graphs, the training module 330 evaluates the importance of the nodes in the set of scene graphs according to any suitable method at 504. In an example implementation, the training module 330 counts the number of instances of each node in the dataset. More important nodes in the dataset will be counted more frequently.

Subsequently, the training module 330 generates seed scene(s) for use as training data based on the importance of the nodes in the set of scene graphs at 506. For example, the training module 330 selects one or two nodes of a seed scene by performing probability based sampling. Nodes that are more important (e.g., more frequent in the set of scene graphs, as determined at 504) are more likely to be selected as nodes of the seed scene. By generating seed scenes from the set of scene graphs, the training module 330 has deconstructed actual outputs (scene graphs) to generate corresponding training inputs (e.g., seed scenes). In this manner, the training module 330 maintains input-output pairs.

FIG. 6 illustrates a flowchart 600 of a series of acts in a method of generating multiple enriched scenes using a single seed scene, in accordance with one or more embodiments. In one or more embodiments, the method 600 is performed in a digital medium environment that includes the scene graph manager 116, the node predictor module 108, and the edge predictor module 110. The method 600 is intended to be illustrative of one or more methods in accordance with the present disclosure and is not intended to limit potential embodiments. Alternative embodiments can include additional, fewer, or different steps than those articulated in FIG. 6.

In act 602, the scene graph expansion subsystem 104 invokes the node predictor module 108 to predict a node. As described herein, the node predictor module 108 ingests a scene sequence (e.g., randomly concatenated flattened subgraph clusters, as described with reference to FIG. 2) and predicts a distribution of nodes using a machine learning model (e.g., one or more layers of GRUs). The distribution is a multinomial distribution.

In act 604, the scene graph expansion subsystem 104 invokes the edge predictor module 110 to predict edge relationships from previous nodes (e.g., previously sampled nodes) to the newly predicted node. As described herein, the edge predictor module 110 ingests historic node-edge relationships, the scene sequence, and local nodes to predict edge relationships.

In act 606, the scene graph expansion subsystem 104 invokes the scene graph manager 116 to determine whether a first stopping criterion is satisfied. The first stopping criterion is a stopping criterion related to a single enriched scene. In an example implementation, the scene graph manager 116 determines that a stopping criterion is satisfied by determining that the scene sequence is exhausted. The scene graph manager 116 determines that the scene sequence is exhausted responsive to detecting an end-of-sequence token. In some embodiments, the scene graph processing module 106 appends an end-of-sequence token (e.g., raises a flag, sets a bit, inserts a predefined node, etc.) to the scene sequence when the scene graph processing module 106 generates the scene sequence. At the end of the first stopping criterion, the scene graph manager 116 will have generated a first enriched scene based on the initial seed scene. If the stopping criterion is not satisfied (e.g., "NO"), then process iterates to act 602 to predict a node of the enriched scene. If the stopping criterion is satisfied (e.g., "YES"), then the process continues to act 608.

In act 608, the scene graph manager 116 determines whether a second stopping criterion is satisfied. The second stopping criterion is related to a number of diverse enriched scenes. The scene graph manager 116 determines whether the second stopping criterion is satisfied after the first stopping criterion is satisfied (e.g., after generating at least one enriched scene). The second stopping criterion defines the number of diverse enriched scenes recommended by the scene graph expansion subsystem 104. If the second stopping criterion is not satisfied (e.g., "NO"), then process iterates to act 602 to predict a node of a new enriched scene associated with the seed scene. If the stopping criterion is satisfied (e.g., "YES"), then the process exits in act 610. The scene graph expansion subsystem 104 provides the one or more enriched scenes to the image generation subsystem and/or output the one or more enriched scenes to a user device or downstream application/process.

Figure 7:
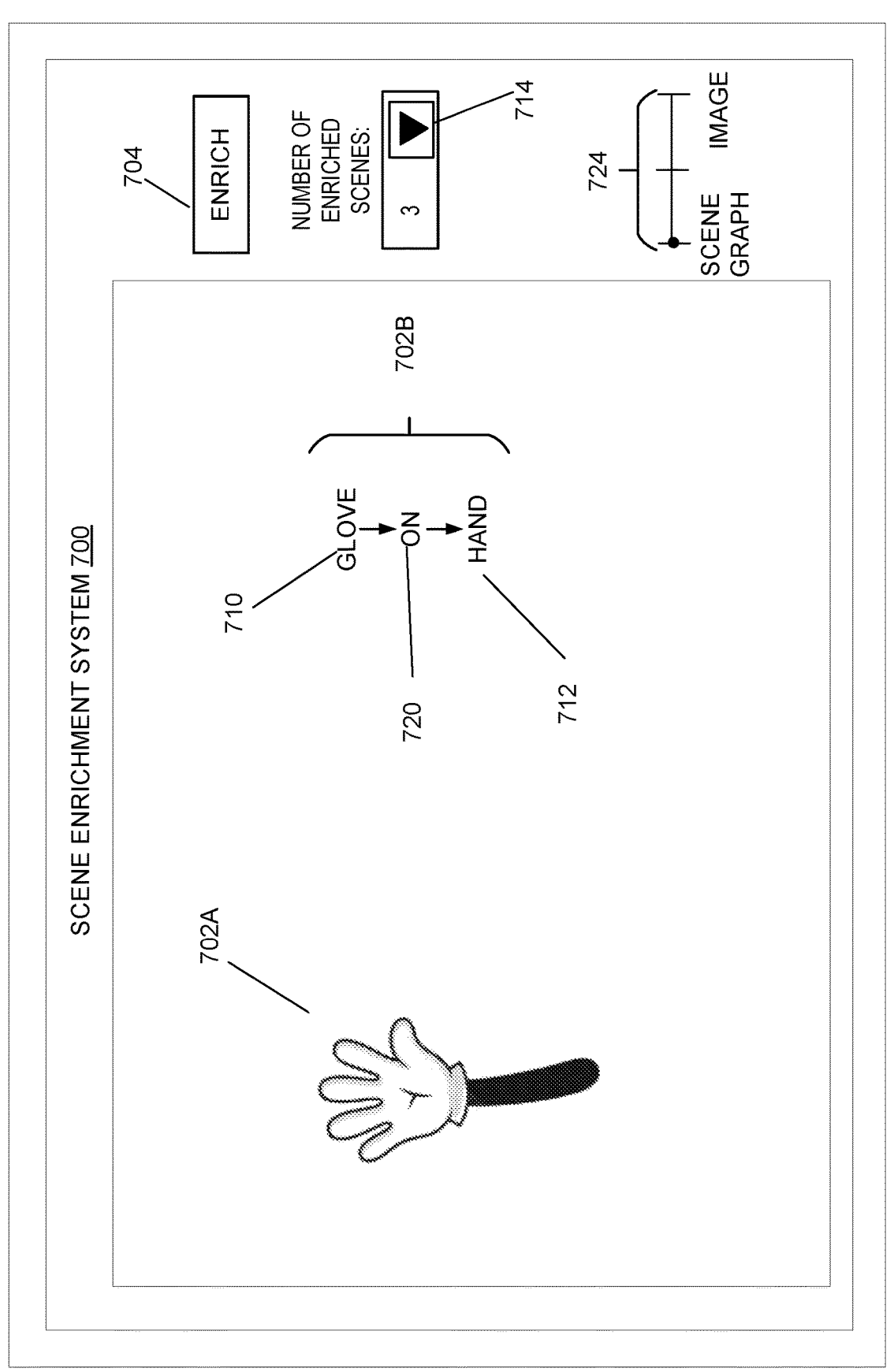
FIG. 7 illustrates an example seed scene in the scene enrichment system, in accordance with one or more embodiments.

FIG. 7 illustrates an example seed scene in the scene enrichment system, in accordance with one or more embodiments. As described herein, scene graphs are a visual tool used to represent an image. The image 702A is an image of a glove on hand. The corresponding scene graph 702B represents the image 702A in scene graph form. As shown, the objects 710 and 712 of the scene graph are "glove" and "hand" respectively. The relationship between the objects, "on" (indicated by 720), interconnects the objects 710-712. As described herein, "objects" are referred to as "nodes" of the scene graph, and the relationship between the objects are referred to as "edges."

A user provides a user motivation, or information about the seed scene (e.g., the image 702A and/or scene graph 702B). A user generates the user motivation (e.g., image 702A and/or scene graph 702B) by typing, speaking, dragging components in a canvas of the scene enrichment system 700, capturing a photograph, importing, or otherwise interacting with the scene enrichment system 700.

The scene enrichment system 700 includes an "enrich" button 704 that the user interacts with (e.g., clicks on, touches, speaks at, gestures to, etc.). Interacting with the button 704 triggers the scene enrichment system 700 to enrich the image 702A and/or scene graph 702B.

The scene enrichment system 700 also includes one or more user preferences. If a user does not interact with a user preference, the scene enrichment system 700 auto-populates one or more default preferences. One user preference, as shown, includes drop-down menu 714. While indicated as a drop down menu, it should be appreciated that user preferences may be received as an input by the scene enrichment system 700 in other ways such as a text box, slider, etc. The user interacts with the drop-down menu 714 to set a number of requested enriched scenes. As described herein, the scene enrichment system 700 is configured to recommend various diverse enriched scenes. Accordingly, the user may select the number of recommendations provided by the scene enrichment system 700. An alternate user preference, as shown, includes slider 724. It should be appreciated that the user preference may be received as an input by the scene enrichment system 700 in other ways. The user interacts with the slider 724 to set the format of the output enriched scenes. As shown, the slider 724 is set to output scene graph enriched scenes. In other embodiments, the slider 724 may be set to image or scene graph and image.

Figure 8:
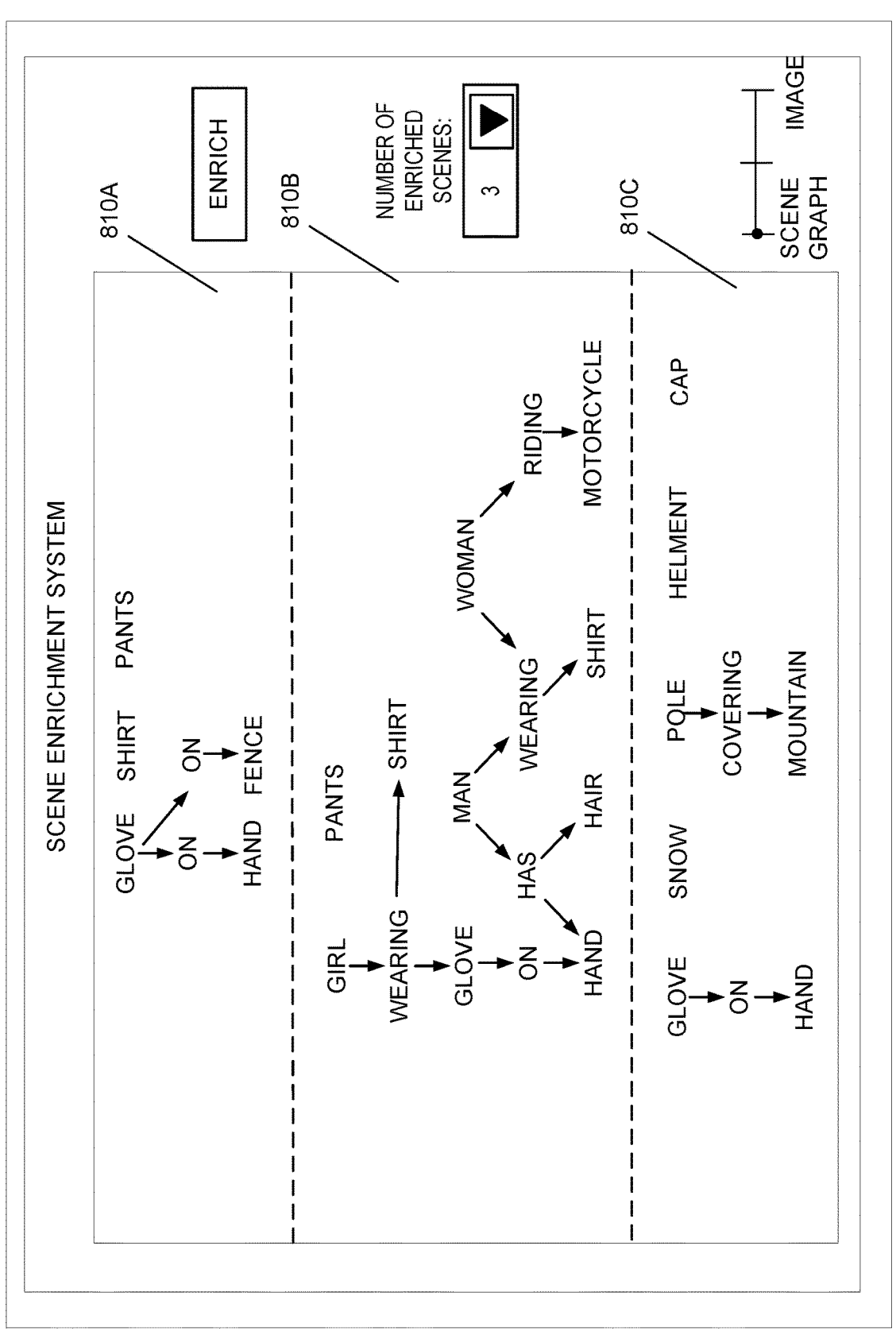
FIG. 8 illustrates an example of enriched scenes generated by the scene enrichment system, in accordance with one or more embodiments.

FIG. 8 illustrates an example of enriched scenes generated by the scene enrichment system, in accordance with one or more embodiments. The scene enrichment system 700 processes the image 702A and/or scene graph 702B as described herein. As a result, the scene enrichment system 700 generates diverse enriched scenes equal to the number of enriched scenes requested by the user. As shown, the scene enrichment system 700 generates three diverse enriched scene graphs 810A-810C corresponding to the three requested enriched scenes in scene graph format (e.g., indicated to the scene enrichment system 700 via drop-down menu 714 and 724 of FIG. 7). Each of the scene graphs 810A-810C expand the seed scene 702B by adding additional nodes and edges to the seed scene 702B.

Figure 9:
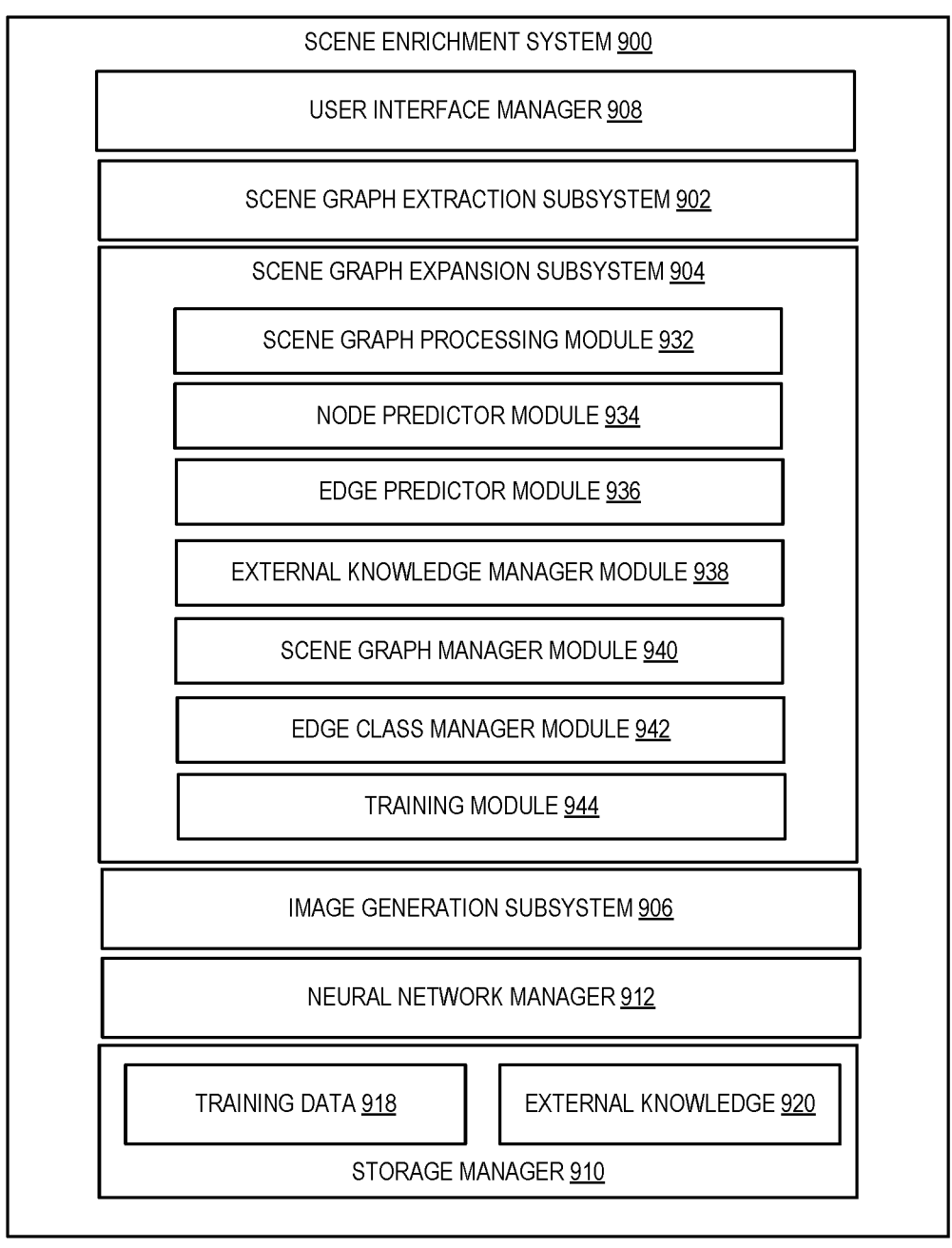
FIG. 9 illustrates a schematic diagram of a scene enrichment system in accordance with one or more embodiments.

FIG. 9 illustrates a schematic diagram of scene enrichment system (e.g., "scene enrichment system" described above) in accordance with one or more embodiments. As shown, the scene enrichment system 900 may include, but is not limited to, a scene graph extraction subsystem 902, a scene graph expansion subsystem 904, an image generation subsystem 906, a storage manager 910, a user interface manager 908, and a neural network manager 912. The scene graph expansion subsystem 904 includes a scene graph processing module 932, a node predictor module 934, an edge predictor module 936, an external knowledge manager module 938, a scene graph manager module 940, an edge class manager module 942, and a training module 944.

The scene enrichment system 900 includes a user interface manager 908. The user interface manager 908 allows a user to provide inputs (e.g., input 120 in FIG. 1, inputs 714 and 724 of FIG. 7) to the scene enrichment system 900. Inputs include user preferences (e.g., a number of diverse enriched scenes, whether the output should be a scene graph, an image, and/or both) and user motivations (e.g., a seed scene, an image). The user may create the user motivation (e.g., typing, drawing, dragging, uploading, etc.) which represents the initial scene to be expanded. For example, the user interface manager 908 may enable the user to download images from a local or remote storage location. For example, the user may provide an address such as a URL or other endpoint associated with an image source. In some embodiments, the user interface can enable a user to link an image capture device such as a camera or other hardware to capture image data and provide it to the scene enrichment system 900.

As described herein, the scene enrichment system 900 receives the user input (including the user motivation). If the input is an image, the scene graph extraction subsystem 902 extracts a scene graph from the input image using any suitable algorithm. If the input is not an image, the scene graph expansion subsystem 904 receives the input scene graph.

The scene graph expansion subsystem 904 executes various modules to expand the input user motivation. For example the scene graph processing module 932 identifies and clusters disconnected subgraphs using the received user motivation. The scene graph processing module 932 also flattens each of the identified subgraph clusters by executing any suitable graph searching algorithm (e.g., a graph traversal algorithm). The scene graph processing module 932 also concatenates each of the clustered subgraph sequences to generate a single scene sequence. The scene graph processing module 932 exports the scene sequence to the node predictor module 934 and the edge predictor module 936.

The node predictor module 934 is trained, using the training module 944 and the external knowledge manager module 938, to predict a distribution of the most likely nodes of the sequence. The training module 944 provides the node predictor module 934 input-output pairs during training. The external knowledge manager module 938 is responsible for querying one or more databases/servers (e.g., local databases, remote databases, etc.) for external knowledge. As described in FIG. 3, the external knowledge (e.g., word embedding) corresponding to the actual output (provided by the training module 944) and/or the predicted output (determined by the node predictor module 934) is used to modify the loss during training.

The edge predictor module 936 receives the predicted node (or distribution of predicted nodes) from the node predictor module 934 and the scene sequence from the graph processing module 932. The edge predictor module 936 is trained, using the training module 944 and the edge class manager module 942, to predict edge relationships between predicted node $v_i$ and one or more previous predicted nodes/present nodes of the sequence. That is, for each new predicted node, the edge module 936 predicts edges with k previous nodes. The training module 944 provides the edge predictor module 936 input-output pairs during training. The edge class manager module 942 is responsible for normalizing the dataset such that dominant edges are not predicted more frequently than non-dominant edges.

As described in FIG. 6, the scene graph manager 940 extends the scene sequence (or the scene graph) by appending predicted nodes and edges to the seed sequence (or scene graph) determined by the user motivation. The scene graph manager 940 is responsible for generating multiple diverse extended scene sequences (or scene graph) according to the user preferences. As described herein, the scene graph manager 940 is also responsible for converting the scene sequence into a scene graph.

In some embodiments, (e.g., depending on the user preference), the scene graph expansion subsystem 904 outputs the scene graph to a user (or other downstream application) directly via the scene graph manager 940. In other embodiments, the scene graph expansion subsystem 904 exports the scene graph (or the scene sequence) to the image generation system 906. The image generation subsystem 906 is configured to generate an image from the scene sequence and/or scene graph using any conventional method.

The scene enrichment system 900 also includes a neural network manager 912. The neural network manager 912 hosts a plurality of neural networks or other machine learning models, such as GRUs of the node predictor module 934 and edge predictor module 936. The neural network manager 912 includes an execution environment, libraries, and/or any other data needed to execute the machine learning models. In some embodiments, the neural network manager 912 may be associated with dedicated software and/or hardware resources to execute the machine learning models. As discussed, the machine learning models of the node predictor module 934 and the edge predictor module 936 can be implemented using any type of auto-regressive model configured to make predictions. In various embodiments, each machine learning model hosted by neural network manager 912 may be the same type of machine learning model or may be different types of machine learning models, depending on implementation. Although depicted in FIG. 9 as being hosted by a single neural network manager 912, in various embodiments the neural networks may be hosted in multiple neural network managers and/or as part of different components. For example, the node predictor module 934 and edge predictor module 936 can be hosted by their own neural network manager, or other host environment, in which the respective neural networks execute, or the machine learning models may be spread across multiple neural network managers depending on, e.g., the resource requirements of each GRU, etc.

As illustrated in FIG. 9, the scene enrichment system 900 also includes the storage manager 910. The storage manager 910 maintains data for the scene enrichment system 900. The storage manager 910 can maintain data of any type, size, or kind as necessary to perform the functions of the scene enrichment system 900. The storage manager 910, as shown in FIG. 9, includes the training data 918. The training data 918 can include the set of scene graphs that the training module uses to extract seed scenes. In other embodiments, training data 918 can include input-output pairs such as manually created seed scenes and manually expanded scene graphs. The storage manager 910 also includes external knowledge 920. As described herein, the external knowledge manager 314 retrieves one or more word embeddings from external knowledge databases (or servers or other devices). In some embodiments, the storage manager 910 stores the retrieved word embeddings. For example, if the external knowledge manager 314 retrieves the same word embedding a threshold number of times, the storage manager 910 stores the word embedding as external knowledge 920.

Each of the components 902-912 of the scene enrichment system 900 and their corresponding elements (as shown in FIG. 9) may be in communication with one another using any suitable communication technologies. It will be recognized that although components 902-912 and their corresponding elements are shown to be separate in FIG. 9, any of components 902-912 and their corresponding elements may be combined into fewer components, such as into a single facility or module, divided into more components, or configured into different components as may serve a particular embodiment.

The components 902-912 and their corresponding elements can comprise software, hardware, or both. For example, the components 902-912 and their corresponding elements can comprise one or more instructions stored on a computer-readable storage medium and executable by processors of one or more computing devices. When executed by the one or more processors, the computer-executable instructions of the scene enrichment system 900 can cause a client device and/or a server device to perform the methods described herein. Alternatively, the components 902-912 and their corresponding elements can comprise hardware, such as a special purpose processing device to perform a certain function or group of functions. Additionally, the components 902-912 and their corresponding elements can comprise a combination of computer-executable instructions and hardware.

Furthermore, the components 902-912 of the scene enrichment system 900 may, for example, be implemented as one or more stand-alone applications, as one or more modules of an application, as one or more plug-ins, as one or more library functions or functions that may be called by other applications, and/or as a cloud-computing model. Thus, the components 902-912 of the scene enrichment system 900 may be implemented as a stand-alone application, such as a desktop or mobile application. Furthermore, the components 902-912 of the scene enrichment system 900 may be implemented as one or more web-based applications hosted on a remote server. Alternatively, or additionally, the components of the scene enrichment system 900 may be implemented in a suite of mobile device applications or "apps."

FIGS. 1-9, the corresponding text, and the examples, provide a number of different systems and devices that assist users in constructing scenes by providing recommendations of objects (and their relationships) to users. In addition to the foregoing, embodiments can also be described in terms of flowcharts comprising acts and steps in a method for accomplishing a particular result. For example, FIG. 10 illustrates a flowchart of an exemplary method in accordance with one or more embodiments. The method described in relation to FIG. 10 may be performed with fewer or more steps/acts or the steps/acts may be performed in differing orders. Additionally, the steps/acts described herein may be repeated or performed in parallel with one another or in parallel with different instances of the same or similar steps/acts.

FIG. 10 illustrates a flowchart 1000 of a series of acts in a method of enriching a scene in accordance with one or more embodiments. In one or more embodiments, the method 1000 is performed in a digital medium environment that includes the scene enrichment system 900. The method 1000 is intended to be illustrative of one or more methods in accordance with the present disclosure and is not intended to limit potential embodiments. Alternative embodiments can include additional, fewer, or different steps than those articulated in FIG. 10.

As illustrated in FIG. 10, the method 1000 includes an act 1002 of clustering one or more subgraphs according to respective one or more maximal connected subgraphs of a scene graph comprising a plurality of nodes and one or more edges. As described herein, a subgraph is a subset of connected nodes and edges of the scene graph. For example, in some implementations, the scene graph processing module 106 identifies each of the maximally connected subgraphs of a received scene graph. Maximally connected subgraphs are a particular class of subgraphs where each node in the subgraph is connected in the scene graph. Clustering subgraphs results in groups of objects connected in the scene graph being placed close together in the scene graph.

The method 1000 includes an act 1004 of generating a scene sequence for the scene graph based on the one or more clustered subgraphs. Generating the scene sequence includes generating one or more clustered subgraph sequences based flattening each of the one or more clustered subgraphs. Flattening each of the one or more clustered subgraphs further includes executing a searching algorithm on each of the one or more clustered subgraphs.

As described herein, the scene graph processing module 106 flattens each of the subgraph clusters by executing a graph searching algorithm (e.g., a graph traversal algorithm). For example, the scene graph processing module 106 may execute a breadth-first search algorithm, a depth-first search algorithm, and the like. The flattened clustered subgraphs are considered clustered subgraph sequences. The method 1000 may also include concatenating the one or more clustered subgraph sequences. The scene graph processing module 106 may concatenate the clustered subgraph sequences in a random order to introduce robustness with respect to a given input.

The method 1000 includes an act 1006 of determining, using a first machine learning model, a predicted node responsive to feeding the scene sequence to the first machine learning model. The first machine learning model is an auto-regressive model trained to predict the node using the scene sequence and an external knowledge loss term. The external knowledge loss term includes a word embedding corresponding to a node of the plurality of nodes of the scene graph. Incorporating the external knowledge loss term into node prediction training results in predicting nodes that are similar to the expected nodes. That is, using external knowledge results in generalization of node predictions, encouraging diverse node predictions instead of multiple similar node predictions. The predicted node is sampled from a distribution of a plurality of predicted nodes determined by the first machine learning model.

The method 1000 includes an act 1008 of determining, using a second machine learning model, a predicted edge responsive to feeding the scene sequence and the predicted node to the second machine learning model. The second machine learning model is an auto-regressive model trained to predict the edge according to a class balanced loss. The second machine learning model is also trained to predict the edge according to historic node-edge relationships, wherein the historic node-edge relationships includes an adjacency matrix. The adjacency matrix indicates an edge between a pair of nodes.

The method 1000 includes an act 1010 of outputting a scene graph according to the predicted node and the predicted edge. Outputting the scene graph comprises appending the predicted edge and the predicted node to the scene sequence. For example, as described herein, the scene graph manager 116 appends the predicted nodes and predicted edges to the scene sequence (or scene graph), enriching the scene sequence. The method 1000 may also include outputting an enriched image using the enriched scene graph. As described herein, the image generation subsystem 118 is configured to generate an image from the scene sequence/scene graph using any conventional method. For example, the image generation subsystem 118 may predict bounding boxes for the nodes of the scene graph and lay out the bounding boxes in a scene layout.

Figure 11:
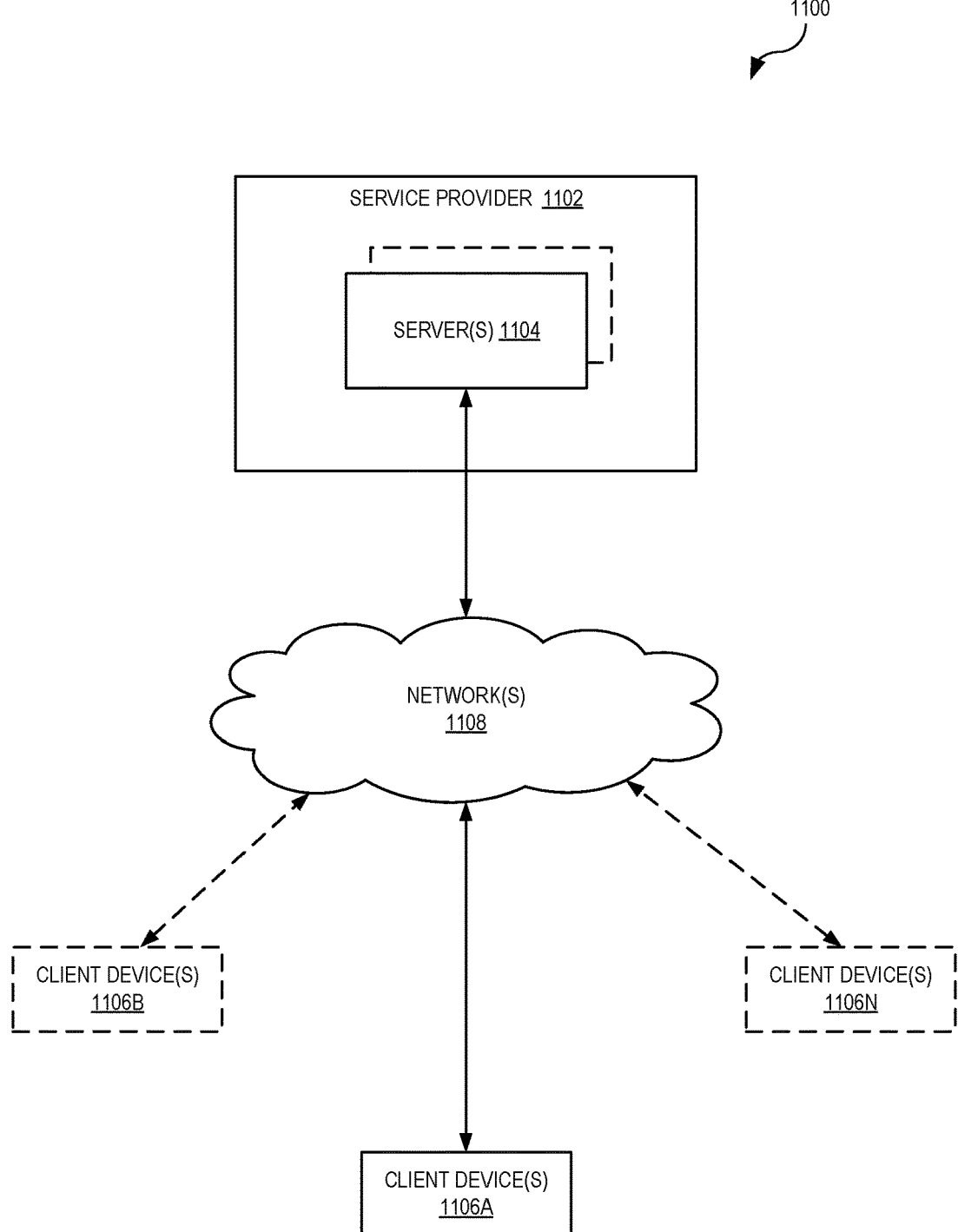
FIG. 11 illustrates a schematic diagram of an exemplary environment in which the scene enrichment system can operate in accordance with one or more embodiments.

FIG. 11 illustrates a schematic diagram of an exemplary environment 1100 in which the scene enrichment system 900 can operate in accordance with one or more embodiments. In one or more embodiments, the environment 1100 includes a service provider 1102 which may include one or more servers 1104 connected to a plurality of client devices 1106A-1106N via one or more networks 1108. The client devices 1106A-1106N, the one or more networks 1108, the service provider 1102, and the one or more servers 1104 may communicate with each other or other components using any communication platforms and technologies suitable for transporting data and/or communication signals, including any known communication technologies, devices, media, and protocols supportive of remote data communications, examples of which will be described in more detail below with respect to FIG. 12.

Although FIG. 11 illustrates a particular arrangement of the client devices 1106A-1106N, the one or more networks 1108, the service provider 1102, and the one or more servers 1104, various additional arrangements are possible. For example, the client devices 1106A-1106N may directly communicate with the one or more servers 1104, bypassing the network 1108. Or alternatively, the client devices 1106A-1106N may directly communicate with each other. The service provider 1102 may be a public cloud service provider which owns and operates their own infrastructure in one or more data centers and provides this infrastructure to customers and end users on demand to host applications on the one or more servers 1104. The servers may include one or more hardware servers (e.g., hosts), each with its own computing resources (e.g., processors, memory, disk space, networking bandwidth, etc.) which may be securely divided between multiple customers, each of which may host their own applications on the one or more servers 1104. In some embodiments, the service provider may be a private cloud provider which maintains cloud infrastructure for a single organization. The one or more servers 1104 may similarly include one or more hardware servers, each with its own computing resources, which are divided among applications hosted by the one or more servers for use by members of the organization or their customers.

Similarly, although the environment 1100 of FIG. 11 is depicted as having various components, the environment 1100 may have additional or alternative components. For example, the environment 1100 can be implemented on a single computing device with the scene enrichment system 900. In particular, the scene enrichment system 900 may be implemented in whole or in part on the client device 1102A.

As illustrated in FIG. 11, the environment 1100 may include client devices 1106A-1106N. The client devices 1106A-1106N may comprise any computing device. For example, client devices 1106A-1106N may comprise one or more personal computers, laptop computers, mobile devices, mobile phones, tablets, special purpose computers, TVs, or other computing devices, including computing devices described below with regard to FIG. 12. Although three client devices are shown in FIG. 11, it will be appreciated that client devices 1106A-1106N may comprise any number of client devices (greater or smaller than shown).

Moreover, as illustrated in FIG. 11, the client devices 1106A-1106N and the one or more servers 1104 may communicate via one or more networks 1108. The one or more networks 1108 may represent a single network or a collection of networks (such as the Internet, a corporate intranet, a virtual private network (VPN), a local area network (LAN), a wireless local network (WLAN), a cellular network, a wide area network (WAN), a metropolitan area network (MAN), or a combination of two or more such networks. Thus, the one or more networks 1108 may be any suitable network over which the client devices 1106A-1106N may access service provider 1102 and server 1104, or vice versa. The one or more networks 1108 will be discussed in more detail below with regard to FIG. 12.

In addition, the environment 1100 may also include one or more servers 1104. The one or more servers 1104 may generate, store, receive, and transmit any type of data, including training data 918, external knowledge 920, and/or other information. For example, a server 1104 may receive data from a client device, such as the client device 1106A, and send the data to another client device, such as the client device 1102B and/or 1102N. The server 1104 can also transmit electronic messages between one or more users of the environment 1100. In one example embodiment, the server 1104 is a data server. The server 1104 can also comprise a communication server or a web-hosting server. Additional details regarding the server 1104 will be discussed below with respect to FIG. 12.

As mentioned, in one or more embodiments, the one or more servers 1104 can include or implement at least a portion of the scene enrichment system 900. In particular, the scene enrichment system 900 can comprise an application running on the one or more servers 1104 or a portion of the scene enrichment system 900 can be downloaded from the one or more servers 1104. For example, the scene enrichment system 900 can include a web hosting application that allows the client devices 1106A-1106N to interact with content hosted at the one or more servers 1104. To illustrate, in one or more embodiments of the environment 1100, one or more client devices 1106A-1106N can access a webpage supported by the one or more servers 1104. In particular, the client device 1106A can run a web application (e.g., a web browser) to allow a user to access, view, and/or interact with a webpage or website hosted at the one or more servers 1104.

Upon the client device 1106A accessing a webpage or other web application hosted at the one or more servers 1104, in one or more embodiments, the one or more servers 1104 can generate an interface (as shown in FIG. 7) configured to receive user motivations (e.g., a scene graph generated via typing, drawing, dragging, etc., an image drawn, dragged, uploaded, etc.) The client device 1106A can be used to input a request (i.e., via user input) to generate K number of diverse recommendations in various formats (e.g., a scene graph, an image, or both). Upon receiving a request from the client device 1106A to generate K number of diverse recommendations in various formats, the one or more servers 1104 can automatically perform the methods and processes described above to enrich the user motivation. The one or more servers 1104 can provide the recommendations to one or more client devices for display to one or more users. Additionally or alternatively, the one or more servers 1104 can provide the recommendations to one or more downstream processors, applications, servers, databases, devices, displays, etc.

As just described, the scene enrichment system 900 may be implemented in whole, or in part, by the individual elements 1102-1108 of the environment 1100. It will be appreciated that although certain components of the scene enrichment system 900 are described in the previous examples with regard to particular elements of the environment 1100, various alternative implementations are possible. For instance, in one or more embodiments, the scene enrichment system 900 is implemented on any of the client devices 1106A-N. Similarly, in one or more embodiments, the scene enrichment system 900 may be implemented on the one or more servers 1104. Moreover, different components and functions of the scene enrichment system 900 may be implemented separately among client devices 1106A-1106N, the one or more servers 1104, and the network 1108.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 12:
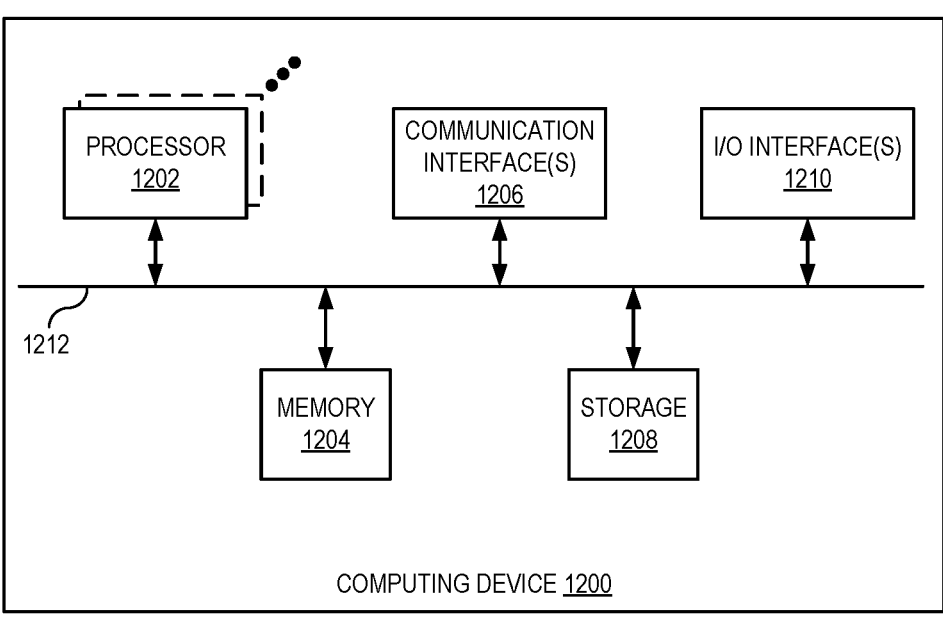
FIG. 12 illustrates a block diagram of an exemplary computing device in accordance with one or more embodiments.

FIG. 12 illustrates, in block diagram form, an exemplary computing device 1200 that may be configured to perform one or more of the processes described above. One will appreciate that one or more computing devices such as the computing device 1200 may implement the scene enrichment system. As shown by FIG. 12, the computing device can comprise a processor 1202, memory 1204, one or more communication interfaces 1206, a storage device 1208, and one or more I/O devices/interfaces 1210. In certain embodiments, the computing device 1200 can include fewer or more components than those shown in FIG. 12. Components of computing device 1200 shown in FIG. 12 will now be described in additional detail.

In particular embodiments, processor(s) 1202 includes hardware for executing instructions, such as those making up a computer program. As an example, and not by way of limitation, to execute instructions, processor(s) 1202 may retrieve (or fetch) the instructions from an internal register, an internal cache, memory 1204, or a storage device 1208 and decode and execute them. In various embodiments, the processor(s) 1202 may include one or more central processing units (CPUs), graphics processing units (GPUs), field programmable gate arrays (FPGAs), systems on chip (SoC), or other processor(s) or combinations of processors.

The computing device 1200 includes memory 1204, which is coupled to the processor(s) 1202. The memory 1204 may be used for storing data, metadata, and programs for execution by the processor(s). The memory 1204 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 1204 may be internal or distributed memory.

The computing device 1200 can further include one or more communication interfaces 1206. A communication interface 1206 can include hardware, software, or both. The communication interface 1206 can provide one or more interfaces for communication (such as, for example, packet-based communication) between the computing device and one or more other computing devices 1200 or one or more networks. As an example and not by way of limitation, communication interface 1206 may include a network interface controller (NIC) or network adapter for communicating with an Ethernet or other wire-based network or a wireless NIC (WNIC) or wireless adapter for communicating with a wireless network, such as a WI-FI. The computing device 1200 can further include a bus 1212. The bus 1212 can comprise hardware, software, or both that couples components of computing device 1200 to each other.

The computing device 1200 includes a storage device 1208 includes storage for storing data or instructions. As an example, and not by way of limitation, storage device 1208 can comprise a non-transitory storage medium described above. The storage device 1208 may include a hard disk drive (HDD), flash memory, a Universal Serial Bus (USB) drive or a combination these or other storage devices. The computing device 1200 also includes one or more input or output ("I/O") devices/interfaces 1210, which are provided to allow a user to provide input to (such as user strokes), receive output from, and otherwise transfer data to and from the computing device 1200. These I/O devices/interfaces 1210 may include a mouse, keypad or a keyboard, a touch screen, camera, optical scanner, network interface, modem, other known I/O devices or a combination of such I/O devices/interfaces 1210. The touch screen may be activated with a stylus or a finger.

The I/O devices/interfaces 1210 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O devices/interfaces 1210 is configured to provide graphical data to a display for presentation to a user. The graphical data may be representative of one or more graphical user interfaces and/or any other graphical content as may serve a particular implementation.

In the foregoing specification, embodiments have been described with reference to specific exemplary embodiments thereof. Various embodiments are described with reference to details discussed herein, and the accompanying drawings illustrate the various embodiments. The description above and drawings are illustrative of one or more embodiments and are not to be construed as limiting. Numerous specific details are described to provide a thorough understanding of various embodiments.

Embodiments may include other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

In the various embodiments described above, unless specifically noted otherwise, disjunctive language such as the phrase "at least one of A, B, or C," is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

We claim:

1. A method comprising:

clustering one or more subgraphs according to respective one or more maximal connected subgraphs of a scene graph comprising a plurality of nodes and one or more edges;

generating a scene sequence for the scene graph based on the one or more clustered subgraphs;

determining, using a first machine learning model, a predicted node responsive to feeding the scene sequence to the first machine learning model;

determining, using a second machine learning model, a predicted edge responsive to feeding the scene sequence and the predicted node to the second machine learning model; and outputting a scene graph according to the predicted node and the predicted edge.

2. The method of claim 1, wherein generating the scene sequence further comprises:

generating one or more clustered subgraph sequences based flattening each of the one or more clustered subgraphs; and concatenating the one or more clustered subgraph sequences.

3. The method of claim 2, wherein flattening each of the one or more clustered subgraphs further comprises:

executing a searching algorithm on each of the one or more clustered subgraphs.

4. The method of claim 1, wherein the first machine learning model is an auto-regressive model trained to predict the node using the scene sequence and an external knowledge loss term, wherein the external knowledge loss term includes a word embedding corresponding to a node of the plurality of nodes of the scene graph.

5. The method of claim 1, wherein the predicted node is sampled from a distribution of a plurality of predicted nodes determined by the first machine learning model.

6. The method of claim 1, wherein the second machine learning model is an auto-regressive model trained to predict the edge according to a class balanced loss.

7. The method of claim 1, wherein the second machine learning model is an auto-regressive model trained to predict the edge according to historic node-edge relationships, wherein the historic node-edge relationships includes an adjacency matrix.

8. The method of claim 7, wherein the adjacency matrix indicates an edge between a pair of nodes.

9. The method of claim 1, wherein outputting the scene graph comprises appending the predicted edge and the predicted node to the scene sequence.

10. The method of claim 1, further comprising:

outputting an enriched image using the scene graph.

11. A system comprising:

a memory component; and a processing device coupled to the memory component, the processing device to perform operations comprising:

executing a first machine learning model to output a predicted node based on a scene sequence of a clustered subgraph of a scene graph, the scene graph comprising a plurality of nodes and one or more edges;

executing a second machine learning model to output a predicted edge based on the scene sequence and the predicted node, wherein the predicted edge is a pair of edge relationships between the predicted node of the scene sequence and a node of the scene sequence; and outputting an enriched scene graph including the predicted node and the predicted edge.

12. The system of claim 11, wherein the first machine learning model is trained using an external knowledge loss term including a word embedding corresponding to a node of the plurality of nodes in the scene graph.

13. The system of claim 11, wherein the predicted node is sampled from a distribution of a plurality of predicted nodes determined by the first machine learning model.

14. The system of claim 11, wherein the second machine learning model is trained using class balanced loss.

15. The system of claim 11, wherein the second machine learning model is trained using historic node-edge relationships, wherein the historic node-edge relationships includes an adjacency matrix.

16. The system of claim 15, wherein the adjacency matrix indicates an edge between a pair of nodes.

17. The system of claim 11, wherein the processing device is further configured to perform operations comprising:

outputting an enriched image using the enriched scene graph.

18. The system of claim 11, wherein the first machine learning model and the second machine learning model are auto-regressive models.

19. A method comprising:

receiving a collection of training scene graphs including at least two nodes and one or more edges into a machine learning model; and training the machine learning model using the collection of training scene graphs to generate an enriched scene graph including the at least the two nodes and the one or more edges, wherein the trained machine learning model predicts a node using the at least two nodes and the one or more edges, and wherein the trained machine learning model predicts an edge, wherein the edge is a pair of edge relationships between the node and the at least two nodes.

20. The method of claim 19, further comprising:

generating the collection of training scene graphs by:

evaluating an importance of each node in a scene graph; and selecting the at least two nodes and one or more edges based on the importance of each node in the scene graph.

* * * * *